(12) United States Patent
  Tang

(10) Patent No.: US 10,834,735 B2
(45) Date of Patent: Nov. 10, 2020

(54) METHOD AND DEVICE FOR SELECTING A CARRIER, AND TERMINAL DEVICE

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/464,065

(22) PCT Filed: Nov. 26, 2017

(86) PCT No.: PCT/CN2017/112997
§ 371 (c)(1),
(2) Date: May 24, 2019

(87) PCT Pub. No.: WO2019/100356
PCT Pub. Date: May 31, 2019

(65) Prior Publication Data
US 2019/0387530 A1    Dec. 19, 2019

(51) Int. Cl.
*H04W 72/10*    (2009.01)
*H04W 72/02*    (2009.01)
*H04W 72/04*    (2009.01)
*H04W 92/18*    (2009.01)

(52) U.S. Cl.
CPC ........... *H04W 72/10* (2013.01); *H04W 72/02* (2013.01); *H04W 72/0453* (2013.01); *H04W 92/18* (2013.01)

(58) Field of Classification Search
CPC .. H04W 72/10; H04W 72/02; H04W 72/0453
See application file for complete search history.

(56) References Cited

U.S. PATENT DOCUMENTS

2018/0332564 A1*    11/2018    Lee ........................ H04W 72/02

FOREIGN PATENT DOCUMENTS

| CN | 103152268 A | 6/2013 |
|---|---|---|
| CN | 106454693 A | 2/2017 |
| CN | 106454694 A | 2/2017 |
| WO | 2017023144 A1 | 2/2017 |

OTHER PUBLICATIONS

European Search Report dated Dec. 2, 2019 from International Application No. PCT/CN2017/112997.
3GPP TSG-RAN WG2 Meeting #100; R2-1713070; Reno, USA, Nov. 27-Dec. 1, 2017.

(Continued)

*Primary Examiner* — Ronald B Abelson

(57) ABSTRACT

A method and a device for selecting a carrier, and a terminal device are provided. The method includes: determining, by a terminal device, a carrier for transmitting data packets with at least one first data packet priority according to configuration information, wherein the configuration information indicates a first correspondence between the at least one first data packet priority and at least one first carrier.

15 Claims, 7 Drawing Sheets

(56) References Cited

OTHER PUBLICATIONS

3GPP TSG-RAN WG2 Meeting #100; R2-1712751; Reno, USA, Nov. 27-Dec. 1, 2017.
3GPP TSG-RAN WG2 Meeting #100; R2-1712947; Reno, USA, Nov. 27.-Dec. 1, 2017.
3GPP TSG-RAN2 Meeting #100; R2-1712178; Reno, USA, Nov. 27-Dec. 1, 2017.
3GPP TSG-RAN WG2 #99bis; R2-1711493; Sidelink Carrier Selection Criteria; Prague, Czech Republic, Oct. 9-13, 2017; pp. 1-6.
EP Examination Report for EP Application No. 17932573.3 dated Mar. 19, 2020.
English Translation of Chinese Office Action for Chinese Application No. 201780050923.X dated Jun. 3, 2020.

* cited by examiner

METHOD AND DEVICE FOR SELECTING A CARRIER, AND TERMINAL DEVICE

CROSS-REFERENCE TO RELATED APPLICATION(S)

This application is a 371 application of International Application No. PCT/CN2017/112997, filed on Nov. 26, 2017, the entire disclosure of which is hereby incorporated by reference.

TECHNICAL FIELD

The present disclosure relates to the field of communication, and more specifically, to a method and a device for selecting a carrier, and a terminal device.

BACKGROUND

In Device-to-Device (D2D) communication, each service may send packets with different packet priorities (ProSe Per-Packet Priority, PPPP), and each service may correspond to a respective carrier or carrier set. How to determine carriers of different PPPP packets by a terminal device is an urgent problem to be solved.

SUMMARY

Implementations of the present disclosure provide a method and a device for selecting a carrier, and a terminal device, wherein the terminal device may determine a correspondence between priorities of data packets and carriers, thereby improving efficiency of data transmission.

In a first aspect, an implementation of the present disclosure provides a method for selecting a carrier, which is applied to Device-to-Device communication, and the method includes: determining, by a terminal device, a carrier for transmitting data packets with at least one first data packet priority according to configuration information, wherein the configuration information indicates a first correspondence between the at least one first data packet priority and at least one first carrier.

Optionally, in one implementation of the first aspect, the first correspondence is used for a first service, the at least one first data packet priority is a data packet priority under the first service, the first service corresponds to at least one second carrier, and the at least one second carrier is a subset of the at least one first carrier.

Optionally, in one implementation of the first aspect, the at least one second carrier is the same as the at least one first carrier.

Optionally, in one implementation of the first aspect, the first correspondence is also used for a second service, the at least one first data packet priority is a data packet priority under the second service, the second service corresponds to at least one third carrier, and the at least one third carrier is a subset of the at least one first carrier.

Optionally, in one implementation of the first aspect, the quantity of carriers of the at least one second carrier is the same as that of the at least one first carrier, and the quantity of carriers of the at least one third carrier is the same as that of the at least one first carrier.

Optionally, in one implementation of the first aspect, a carrier in the at least one second carrier is the same as a carrier in the at least one first carrier, and a carrier in the at least one third carrier is the same as a carrier in the at least one first carrier.

Optionally, in one implementation of the first aspect, carriers in the at least one second carrier are partially or completely different from carriers in the at least one third carrier.

Optionally, in one implementation of the first aspect, the quantity of carriers of the at least one second carrier is different from that of the at least one third carrier.

Optionally, in one implementation of the first aspect, before the determining, by the terminal device, the carrier for transmitting the data packets with the at least one first data packet priority according to the configuration information, the method further includes: receiving, by the terminal device, the configuration information from a core network device.

Optionally, in one implementation of the first aspect, before the determining, by the terminal device, the carrier for transmitting the data packets with the at least one first data packet priority according to the configuration information, the method further includes: receiving, by an access layer of the terminal device, the configuration information from a higher layer of the terminal device.

Optionally, in one implementation of the first aspect, before the determining, by the terminal device, the carrier for transmitting the data packets with the at least one first data packet priority according to the configuration information, the method further includes: receiving, by the terminal device, the configuration information from an access network device.

In a second aspect, an implementation of the present disclosure provides a method for selecting a carrier, which is applied to Device-to-Device communication, and the method includes: transmitting configuration information to a terminal device, wherein the configuration information indicates a first correspondence between at least one first data packet priority and at least one first carrier.

Optionally, in one implementation of the second aspect, the transmitting configuration information to the terminal device includes: transmitting, by a core network device, the configuration information to the terminal device.

Optionally, in one implementation of the second aspect, the transmitting configuration information to the terminal device includes: transmitting, by a higher layer of the terminal device, the configuration information to an access layer of the terminal device.

Optionally, in one implementation of the second aspect, the transmitting configuration information to the terminal device includes: transmitting, by an access network device, the configuration information to an access layer of the terminal device.

In a third aspect, an implementation of the present disclosure provides a method for selecting a carrier, which is applied to Device-to-Device communication, and the method includes: determining, by a terminal device, a carrier for transmitting data packets with at least one first data packet priority under a first service according to configuration information, wherein the configuration information indicates a first correspondence between the first service and at least one channel busy ratio (CBR) threshold value.

Optionally, in one implementation of the third aspect, the first service corresponds to at least one first carrier, the determining, by the terminal device, the carrier for transmitting the data packets with the at least one first data packet priority under the first service according to the configuration information, includes: selecting, by the terminal device, the carrier for transmitting the data packets with the at least one first data packet priority from the at least one first carrier.

Optionally, in one implementation of the third aspect, the configuration information includes a channel busy ratio (CBR) threshold value of the at least one first data packet priority; the determining, by the terminal device, the carrier for transmitting the data packet with the at least one first data packet priority according to the configuration information, includes: determining, by the terminal device, a current CBR value of the at least one first carrier; and selecting, by the terminal device, the carrier for transmitting the data packets with the at least one first data packet priority from at least one first carrier whose current CBR value is less than or equal to a CBR threshold value of the at least one first data packet priority.

Optionally, in one implementation of the third aspect, the configuration information includes a CBR threshold value of the at least one first carrier; the determining, by the terminal device, the carrier for transmitting the data packet with the at least one first data packet priority according to the configuration information, includes: determining, by the terminal device, a current CBR value of the at least one first carrier; and selecting, by the terminal device, the carrier for transmitting the data packets with the at least one first data packet priority from carriers whose current CBR value is less than or equal to a CBR threshold value of the at least one first carrier.

Optionally, in one implementation of the third aspect, before the determining, by the terminal device, the carrier for transmitting the data packets with the at least one first data packet priority according to the configuration information, the method further includes: receiving, by the terminal device, the configuration information from a core network device.

Optionally, in one implementation of the third aspect, before the determining, by the terminal device, the carrier for transmitting the data packets with the at least one first data packet priority according to the configuration information, the method further includes: receiving, by an access layer of the terminal device, the configuration information from a higher layer of the terminal device.

In a fourth aspect, an implementation of the present disclosure provides a method for selecting a carrier, which is applied to Device-to-Device communication, and the method includes: transmitting configuration information to a terminal device, wherein the configuration information indicates a first correspondence between a first service and at least one channel busy ratio (CBR) threshold value under the first service, and the first service corresponds to at least one first carrier.

Optionally, in one implementation of the fourth aspect, the configuration information includes a channel busy ratio (CBR) threshold value of the at least one first data packet priority.

Optionally, in one implementation of the fourth aspect, the configuration information includes a CBR threshold value of the at least one first carrier.

Optionally, in one implementation of the fourth aspect, the transmitting configuration information to the terminal device includes: transmitting, by a core network device, the configuration information to the terminal device.

Optionally, in one implementation of the fourth aspect, the transmitting configuration information to the terminal device includes: transmitting, by a higher layer of the terminal device, the configuration information to an access layer of the terminal device.

In a fifth aspect, an implementation of the present disclosure provides a method for selecting a carrier, which is applied to Device-to-Device communication, and the method includes: determining, by a terminal device, a carrier for transmitting data packets with at least one first data packet priority according to first configuration information, wherein the first configuration information indicates a first correspondence between at least one first carrier priority and at least one first carrier.

Optionally, in one implementation of the fifth aspect, the first correspondence is used for a first service, the first service corresponds to at least one second carrier, and the at least one second carrier is a subset of the at least one first carrier.

Optionally, in an implementation of the fifth aspect, the determining, by the terminal device, the carrier for transmitting the data packets with the at least one first data packet priority according to the first configuration information, includes: determining, by the terminal device, a second correspondence between the at least one first data packet priority and the at least one second carrier according to the first correspondence; and determining, by the terminal device, the carrier for transmitting the data packets with the at least one first data packet priority according to the second correspondence.

Optionally, in an implementation of the fifth aspect, the determining, by the terminal device, the second correspondence between the at least one first data packet priority and the at least one second carrier according to the first correspondence, includes: determining, by the terminal device, the second correspondence according to second configuration information, wherein the second configuration information indicates a third correspondence from a correspondence between carrier priorities and carriers, and at least one carrier that corresponds to a target service, to a correspondence between data packet priorities and carriers.

Optionally, in one implementation of the fifth aspect, the at least one second carrier is the same as the at least one first carrier.

Optionally, in one implementation of the fifth aspect, the first correspondence is also used for a second service, the second service corresponds to at least one third carrier, and the at least one third carrier is a subset of the at least one first carrier.

Optionally, in an implementation of the fifth aspect, the determining, by the terminal device, the carrier for transmitting the data packets with the at least one first data packet priority according to the configuration information, includes: determining, by the terminal device, a fourth correspondence between the at least one first data packet priority and the at least one third carrier according to the first correspondence; and determining, by the terminal device, the carrier for transmitting the data packets with the at least one first data packet priority according to the fourth correspondence.

Optionally, in an implementation of the fifth aspect, the determining, by the terminal device, the fourth correspondence between the at least one first data packet priority and the at least one third carrier according to the first correspondence, includes: determining, by the terminal device, the fourth correspondence according to the second configuration information.

Optionally, in an implementation of the fifth aspect, the determining, by the terminal device, the fourth correspondence between the at least one first data packet priority and the at least one third carrier according to the first correspondence, includes: receiving, by the terminal device, third configuration information, wherein the third configuration information indicates a fifth correspondence from a correspondence between carrier priorities and carriers, and at least one carrier that corresponds to a target service, to a correspondence between data packet priorities and carriers; and determining, by the terminal device, the fourth correspondence according to the fifth correspondence.

Optionally, in one implementation of the fifth aspect, the quantity of carriers of the at least one second carrier is the same as that of the at least one first carrier, and the quantity of carriers of the at least one third carrier is the same as that of the at least one first carrier.

Optionally, in one implementation of the fifth aspect, a carrier in the at least one second carrier is the same as a carrier in the at least one first carrier, and a carrier in the at least one third carrier is the same as the carrier in the at least one first carrier.

Optionally, in one implementation of the fifth aspect, carriers in the at least one second carrier are partially or completely different from carriers in the at least one third carrier.

Optionally, in one implementation of the fifth aspect, the quantity of carriers of the at least one second carrier is different from that of the at least one third carrier.

Optionally, in one implementation of the fifth aspect, the carrier priority is used for instructing the terminal device to preferentially transmit the data packet with the at least one first data packet priority on a carrier with a higher carrier priority.

Optionally, in an implementation of the fifth aspect, before the determining, by the terminal device, the carrier for transmitting the data packets with the at least one first data packet priority according to the first configuration information, the method further includes: receiving, by the terminal device, the first configuration information from a core network device.

Optionally, in one implementation of the fifth aspect, before the determining, by the terminal device, the carrier for transmitting the data packets with the at least one first data packet priority according to the first configuration information, the method further includes: receiving, by an access layer of the terminal device, the first configuration information from a higher layer of the terminal device.

Optionally, in one implementation of the fifth aspect, before the determining, by the terminal device, the carrier for transmitting the data packets with the at least one first data packet priority according to the first configuration information, the method further includes: receiving, by the terminal device, the first configuration information from an access network device.

Optionally, in an implementation of the fifth aspect, before the determining, by the terminal device, the third correspondence according to the second configuration information, the method further includes: receiving, by the terminal device, the second configuration information from a core network device.

Optionally, in one implementation of the fifth aspect, before the determining, by the terminal device, the third correspondence according to the second configuration information, the method further includes: receiving, by an access layer of the terminal device, the second configuration information from a higher layer of the terminal device.

Optionally, in one implementation of the fifth aspect, before the determining, by the terminal device, the third correspondence according to the second configuration information, the method further includes: receiving, by the terminal device, the second configuration information from an access network device.

Optionally, in an implementation of the fifth aspect, before the determining, by the terminal device, the fifth correspondence according to third configuration information, the method further includes: receiving, by the terminal device, the third configuration information from a core network device.

Optionally, in an implementation of the fifth aspect, before the determining, by the terminal device, the fifth correspondence according to third configuration information, the method further includes: receiving, by an access layer of the terminal device, the third configuration information from a higher layer of the terminal device.

In a sixth aspect, an implementation of the present disclosure provides a method for selecting a carrier, which is applied to Device-to-Device communication, and the method includes: transmitting first configuration information to a terminal device, wherein the first configuration information indicates a first correspondence between at least one first carrier priority and at least one first carrier.

Optionally, in one implementation of the sixth aspect, the first correspondence is for a first service, the first service corresponds to at least one second carrier, and the at least one second carrier is a subset of the at least one first carrier.

Optionally, in an implementation of the sixth aspect, the method further includes: transmitting second configuration information to the terminal device, wherein the second configuration information indicates a third correspondence from a correspondence between carrier priorities and carriers, and at least one carrier that corresponds to a target service, to a correspondence between data packet priorities and carriers.

Optionally, in one implementation of the sixth aspect, the first correspondence is also used for a second service that corresponds to at least one third carrier that is a subset of the at least one first carrier.

Optionally, in an implementation of the sixth aspect, the method further includes: transmitting third configuration information to the terminal device, wherein the third configuration information indicates a fifth correspondence from a correspondence between carrier priorities and carriers, and at least one carrier that corresponds to a target service, to a correspondence between data packet priorities and carriers.

Optionally, in an implementation of the sixth aspect, the carrier priority is used for instructing the terminal device to preferentially transmit the data packet with the at least one first data packet priority on a carrier with a higher carrier priority.

Optionally, in one implementation of the sixth aspect, the transmitting first configuration information to the terminal device includes: transmitting, by a core network device, the first configuration information to the terminal device.

Optionally, in one implementation of the sixth aspect, the transmitting first configuration information to the terminal device includes: transmitting, by a higher layer of the terminal device, the first configuration information to an access layer of the terminal device.

Optionally, in an implementation of the sixth aspect, the transmitting first configuration information to the terminal device includes: transmitting, by an access network device, the first configuration information to the terminal device.

Optionally, in one implementation of the sixth aspect, the transmitting second configuration information to the terminal device includes: transmitting, by a core network device, the second configuration information to the terminal device.

Optionally, in one implementation of the sixth aspect, the transmitting second configuration information to the terminal device includes: transmitting, by a higher layer of the terminal device, the second configuration information to an access layer of the terminal device.

Optionally, in one implementation of the sixth aspect, the transmitting second configuration information to the terminal device includes: transmitting, by an access network device, the second configuration information to the terminal device.

Optionally, in one implementation of the sixth aspect, the transmitting third configuration information to the terminal device includes: transmitting, by a core network device, the third configuration information to the terminal device.

Optionally, in one implementation of the sixth aspect, the transmitting third configuration information to the terminal device includes: transmitting, by a higher layer of the terminal device, the third configuration information to an access layer of the terminal device.

In a seventh aspect, an implementation of the present disclosure provides a terminal device that may execute a module or unit of the method in the first aspect or any alternative implementation of the first aspect.

In an eighth aspect, an implementation of the present disclosure provides a device for selecting a carrier, which may execute a module or unit of the method in the second aspect or any alternative implementation of the second aspect.

In the ninth aspect, an implementation of the present disclosure provides a terminal device that may execute a module or unit of the method in the third aspect or any alternative implementation of the third aspect.

In a tenth aspect, an implementation of the present disclosure provides a device for selecting a carrier, which may execute a module or unit of the method in the fourth aspect or any alternative implementation of the fourth aspect.

In an eleventh aspect, an implementation of the present disclosure provides a terminal device that may execute a module or unit of the method in the fifth aspect or any alternative implementation of the fifth aspect.

In a twelfth aspect, an implementation of the present disclosure provides a device for selecting a carrier, which may execute a module or unit of the method in the sixth aspect or any alternative implementation of the sixth aspect.

In a thirteenth aspect, there is provided a terminal device including a processor, a memory, and a communication interface. The processor is connected with the memory and the communication interface. The memory is used for storing instructions, the processor is used for executing the instructions, and the communication interface is used for communicating with other network elements under the control of the processor. When the processor executes instructions stored in the memory, the execution causes the processor to execute the method in the first aspect or any possible implementation of the first aspect.

In a fourteenth aspect, there is provided a device for selecting a carrier, and the device includes a processor, a memory, and a communication interface. The processor is connected with the memory and the communication interface. The memory is used for storing instructions, the processor is used for executing the instructions, and the communication interface is used for communicating with other network elements under the control of the processor. When the processor executes instructions stored in the memory, the execution causes the processor to execute the method in the second aspect or any possible implementation of the second aspect.

In a fifteenth aspect, there is provided a terminal device including a processor, a memory, and a communication interface. The processor is connected with the memory and the communication interface. The memory is used for storing instructions, the processor is used for executing the instructions, and the communication interface is used for communicating with other network elements under the control of the processor. When the processor executes the instructions stored in the memory, the execution causes the processor to execute the method in the third aspect or any possible implementation of the third aspect.

In a sixteenth aspect, there is provided a device for selecting a carrier, and the device includes a processor, a memory, and a communication interface. The processor is connected with the memory and the communication interface. The memory is used for storing instructions, the processor is used for executing the instructions, and the communication interface is used for communicating with other network elements under the control of the processor. When the processor executes the instructions stored in the memory, the execution causes the processor to execute the method in the fourth aspect or any possible implementation of the fourth aspect.

In a seventeenth aspect, there is provided a terminal device including a processor, a memory, and a communication interface. The processor is connected with the memory and the communication interface. The memory is used for storing instructions, the processor is used for executing the instructions, and the communication interface is used for communicating with other network elements under the control of the processor. When the processor executes instructions stored in the memory, the execution causes the processor to execute the method in the fifth aspect or any possible implementation of the fifth aspect.

In an eighteenth aspect, there is provided a device for selecting a carrier, and the device includes a processor, a memory, and a communication interface. The processor is connected with the memory and the communication interface. The memory is used for storing instructions, the processor is used for executing the instructions, and the communication interface is used for communicating with other network elements under the control of the processor. When the processor executes instructions stored in the memory, the execution causes the processor to execute the method in the sixth aspect or any possible implementation of the sixth aspect.

In a nineteenth aspect, there is provided a computer storage medium having stored program code for instructing a computer to execute instructions of the methods described in the above various aspects.

In a twentieth aspect, there is provided a computer program product including instructions that, when executed on a computer, cause the computer to perform the methods described in the above various aspects.

DETAILED DESCRIPTION

Technical schemes in implementations of the present disclosure will be clearly and completely described below with reference to the drawings in the implementations of the present disclosure.

It should be understood that the technical schemes of the implementations of the present disclosure may be applied to a Device-to-Device (D2D) communication system, for example, a vehicle networking system that performs D2D communication based on Long Term Evolution (LTE). Different from a traditional LTE system in which communication data between terminals is received or transmitted through a network device (e.g., a base station), a vehicle networking system adopts a Device-to-Device direct communication manner, thus having higher spectral efficiency and lower transmission delay.

Optionally, a communication system on which a vehicle networking system is based may be a Global System of Mobile communication (GSM) system, Code Division Multiple Access (CDMA) system, Wideband Code Division Multiple Access (WCDMA) system, General Packet Radio Service (GPRS) system, LTE system, LTE Frequency Division Duplex (FDD) system, LTE Time Division Duplex (TDD) system, Universal Mobile Telecommunication System (UMTS) system, Worldwide Interoperability for Microwave Access (WiMAX) communication system, 5G New Radio (NR) system, etc.

A terminal device in the implementation of the present disclosure may be a terminal device capable of realizing D2D communication. For example, it may be a vehicle-mounted terminal device, a terminal device in a 5G network or a terminal device in a Public Land Mobile Network (PLMN) to be evolved in the future, and the implementation of the present disclosure is not limited thereto.

Figure 1:
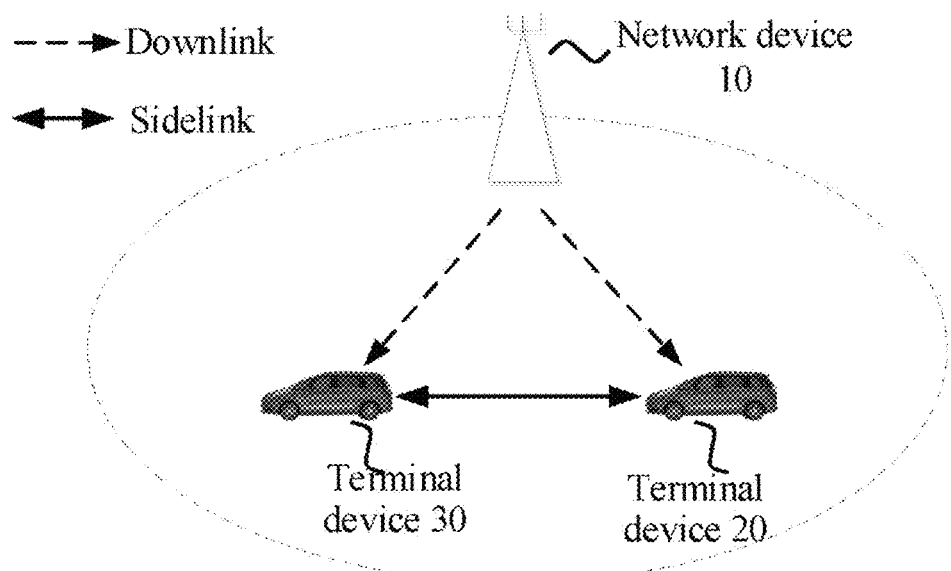
FIG. 1 is a schematic diagram of an application scenario according to an implementation of the present disclosure.
Figure 2:
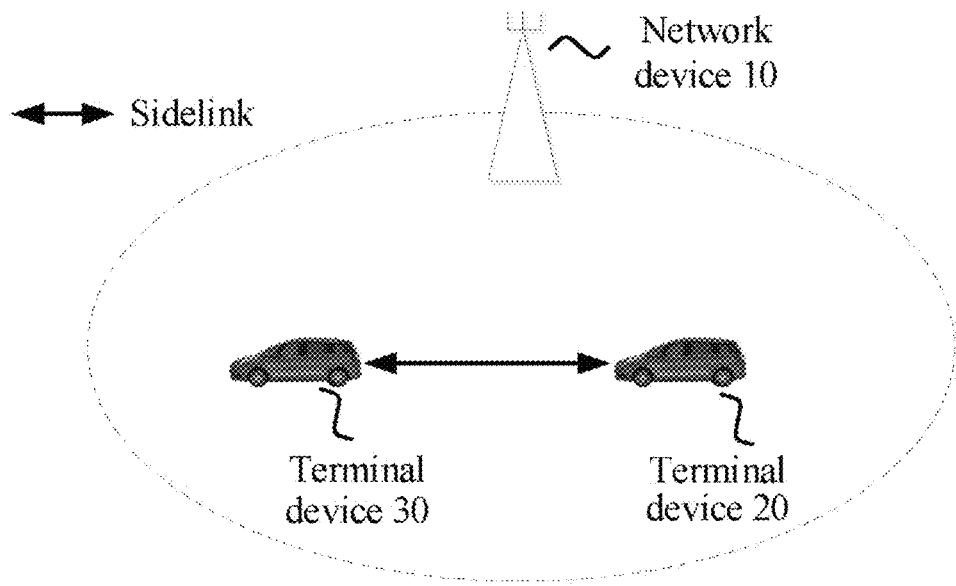
FIG. 2 is a schematic diagram of another application scenario of the implementation of the present disclosure.

FIGS. 1 and 2 are schematic diagrams of an application scenario of an implementation of the present disclosure.

FIG. 1 exemplifies one network device and two terminal devices, optionally, a wireless communication system in the implementation of the present disclosure may include a plurality of network devices and a coverage area of each network device may include other number of terminal devices, which is not limited in the implementation of the present disclosure.

Optionally, the wireless communication system may include other network entities such as a Mobile Management Entity (MME), a Serving Gateway (S-GW), a Packet Data Network Gateway (P-GW), or, the wireless communication system may include other network entities such as Session Management Function (SMF), Unified Data Management (UDM), Authentication Server Function (AUSF), etc. The implementation of the present disclosure is not limited thereto.

Specifically, a terminal device 20 and a terminal device 30 may communicate through a D2D communication mode. During D2D communication, the terminal device 20 and the terminal device 30 directly communicate through a D2D link, that is, a Sidelink (SL). For example, as shown in FIG. 1 or FIG. 2, the terminal device 20 and the terminal device 30 communicate directly through a Sidelink. In FIG. 1, the terminal device 20 and the terminal device 30 communicate via a Sidelink, and their transmission resources are allocated by a network device. In FIG. 2, the terminal device 20 and the terminal device 30 communicate through a Sidelink, and their transmission resources thereof are independently selected by the terminal devices, and the network device is not required to allocate the transmission resources.

D2D communication may refer to vehicle-to-vehicle (V2V) communication or vehicle-to-everything (V2X) communication. In the V2X communication, X may generally refer to any device with wireless receiving and transmitting capabilities, such as but not limited to slow moving wireless apparatuses, fast moving Vehicle User Equipment, or network control nodes with wireless transmitting and receiving capabilities. It should be understood that the implementations of the present disclosure are mainly applied to V2X communication scenarios, but it may also be applied to any other D2D communication scenarios, and the implementations of the present disclosure are not limited thereto.

In a vehicle networking system, there may be two types of terminal devices, namely, a terminal device with a listening capability such as a Vehicle User Equipment (VUE) or a Pedestrian User device (PUE), and a terminal device without a listening capability such as a PUE. A VUE has a higher processing capability and is usually powered by a battery in a car, while a PUE has a lower processing capability and reducing power consumption is a major factor to be considered by the PUE. Therefore, in existing vehicle networking systems, a VUE is considered to have full receiving capability and listening capability, while a PUE is considered to have partial or no receiving and listening capabilities. If a PUE has partial listening capability, listening methods similar to a VUE may be adopted for selection of resources of the PUE, and selection of available resources may be carried out on the part of resources that may be listened; if the PUE does not have listening capability, the PUE randomly selects transmission resources in a resource pool.

In addition, various aspects or features of the present disclosure may be implemented as methods, apparatuses, or articles of manufacture using standard programming and/or engineering techniques. The term "article of manufacture" used in the present disclosure encompasses a computer program accessible from any computer-readable device, carrier, or medium. For example, the computer-readable medium may include, but not limited to, a magnetic storage device (such as a hard disk, a floppy disk, or a magnetic tape), a disk (such as a compact disc (CD), a digital versatile disc (Digital Versatile Disc, DVD)), smart cards and flash storage devices (such as Erasable Programmable Read-Only Storage (EPROM), cards, sticks or key drives). In addition, the various storage media described herein may represent one or more devices and/or other machine-readable medium for storing information. The term "machine-readable medium" may include, but is not limited to, various media capable of storing, containing, and/or carrying instructions and/or data.

It should be understood that the terms "system" and "network" are often used interchangeably herein. The term "and/or" in this document is merely an association relationship describing an associated object, indicating that there may be three relationships, for example, A and/or B may indicate three situations: A alone, A and B, and B alone. In addition, the symbol "/" in this document generally indicates that objects of the former and the latter connected by "/" has an "or" relationship.

Figure 3:
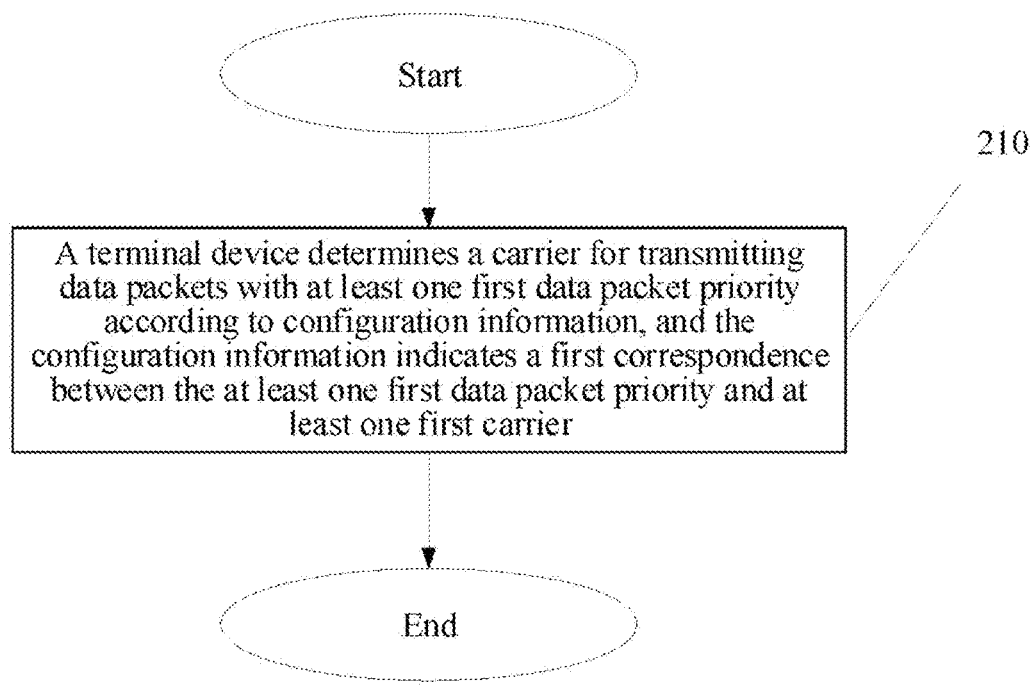
FIG. 3 is a schematic flow chart of a method for selecting a carrier according to an implementation of the present disclosure.

FIG. 3 is a schematic flow chart of a method 200 for selecting a carrier according to an implementation of the present disclosure. As shown in FIG. 3, the method 200 may be executed by a terminal device, which may be a terminal device as shown in FIG. 1 or FIG. 2, and is applied to Device-to-Device communication, and the method 200 includes the following contents.

In 210, a terminal device determines a carrier for transmitting data packets with at least one first data packet priority according to configuration information, and the configuration information indicates a first correspondence between the at least one first data packet priority and at least one first carrier.

Optionally, the terminal device may be a terminal device supporting D2D communication.

It should be understood that each service has a unique service identifier, data packets under each service may have different data packet priorities, and each service may send data packets with different data packet priorities.

Optionally, there are a total of 8 carriers for transmitting data packets, for example, a-h.

Optionally, each service may correspond to at least one carrier, for example, service 1 corresponds to carrier b and carrier c, and service 2 corresponds to carrier e, carrier f, carrier g and carrier h.

Optionally, the first carrier may be carriers a-h.

Optionally, a packet priority may have 8 levels, for example, 1-8.

Optionally, the first data packet priority may be data packet priorities 1-8.

Optionally, an order of data packet priorities of data packets may be: data packet priority 1>data packet priority 2>data packet priority 3>data packet priority 4>data packet priority 5>data packet priority 6>data packet priority 7>data packet priority 8.

Optionally, the first correspondence may be represented by one table, for example, Table 1, which includes a correspondence between data packet priorities 1-8 and carriers a-h.

For example, service 1 corresponds to carriers a-d, and then only the correspondence between data packet priorities 1-8 and carriers a-d in Table 1 is considered for service 1.

For another example, service 2 corresponds to carriers e-f, and then only a correspondence between data packet priorities 1-8 and carriers e-f in Table 1 is considered for service 2.

Optionally, the first correspondence may be represented by eight tables, for example, Tables 1-8, Table 1 includes a correspondence between data packet priorities 1-8 and one carrier, Table 2 includes a correspondence between data packet priorities 1-8 and two carriers, Table 3 includes a correspondence between data packet priorities 1-8 and three carriers, Table 4 includes a correspondence between data packet priorities 1-8 and four carriers, Table 5 includes a correspondence between data packet priorities 1-8 and five carriers, Table 6 includes a correspondence between data packet priorities 1-8 and six carriers, Table 7 includes a correspondence between data packet priorities 1-8 and seven carriers, and Table 8 includes a correspondence between data packet priorities 1-8 and eight carriers.

For example, service 1 corresponds to two carriers, and then only the correspondence between data packet priorities 1-8 and the two carriers in Table 2 is considered for service 1.

For another example, service 2 corresponds to five carriers, and then only the correspondence between data packet priorities 1-8 and five carriers in Table 5 is considered for service 2.

Optionally, the first correspondence may be represented by n $(C_8^1+C_8^2+C_8^3+C_8^4+C_8^5+C_8^6+C_8^7+C_8^8)$ tables, for example, by Tables 1, 2, 3 . . . n. Table 1 includes a correspondence between data packet priorities 1-8 and carrier a, Table 2 includes a correspondence between data packet priorities 1-8 and carrier b, Table 3 includes a correspondence between data packet priorities 1-8 and carrier c, . . . , and Table n includes a correspondence between data packet priorities 1-8 and carriers a-h.

For example, service 1 corresponds to two carriers a and b, and then a table with the quantity of carriers of 2 and with carriers a and b, needs to be considered for service 1.

For another example, service 2 corresponds to two carriers e and f, and then a table with the quantity of carriers of 2 and with carriers e and f, needs to be considered for service 2.

Optionally, the first correspondence may be specific to a specific service. For example, service 1 corresponds to two carriers a and b, and service 2 also corresponds to the two carriers a and b. At this time, a first correspondence for service 1 is different from a first correspondence for service 2.

For example, when a terminal device needs to transmit a data packet A with a data packet priority of 2, it may select a carrier from carriers corresponding to the data packet priority of 2 to transmit the data packet A.

Optionally, the first correspondence may exist in a form of a list or an operation formula, and the implementation of the present disclosure does not limit thereto.

Optionally, the terminal device may receive the configuration information from a core network device, may receive the configuration information from a higher layer of the terminal device, or may receive the configuration information from an access network device.

Specifically, an access layer of the terminal device receives the configuration information.

Optionally, the configuration information may be configured by the access layer of the terminal device.

Optionally, the configuration information may be preconfigured for the terminal device.

Optionally, the first correspondence is used for a first service, the at least one first data packet priority is a data packet priority under the first service, the first service corresponds to at least one second carrier, and the at least one second carrier is a subset of the at least one first carrier.

Optionally, the second carrier may be carriers a-h.

For example, the first service is service A, service A corresponds to carrier a, carrier c, and carrier d, and service A includes data packets with data packet priorities of 2 and 3. According to the first correspondence, the data packet priority 2 corresponds to carrier b, carrier c, and carrier d, and the data packet priority 3 corresponds to carrier d and carrier e. Therefore, a terminal device may select one of carrier c and carrier d to transmit data packets with the data packet priority of 2 under service A, and the terminal device may transmit data packets with the data packet priority of 3 under service A on carrier d.

Optionally, when a terminal device selects a carrier for transmitting data packets with a data packet priority of 2 under service A from carrier c and carrier d, it may select the carrier in combination with transmission powers of the carrier c and the carrier d, or it may select the carrier in combination with Channel Busy Ratio (CBR) threshold values of the carrier c and the carrier d.

Optionally, the at least one second carrier is the same as the at least one first carrier.

For example, the at least one second carrier is carriers a-h, and the at least one first carrier is also carriers a-h.

For example, the first service is service A, service A corresponds to carriers a-h, and service A includes data packets with data packet priorities of 2 and 3. According to the first correspondence, the data packet priority 2 corresponds to carrier b, carrier c, and carrier d, and the data packet priority 3 corresponds to carrier d and carrier e. Therefore, a terminal device may select one of carrier b, carrier c, and carrier d to transmit data packets with the data packet priority of 2 under service A, and the terminal device may select one of carrier d and carrier e to transmit data packets with the data packet priority of 3 under service A.

Optionally, the first correspondence is used for a first service and a second service, the at least one first data packet priority is a data packet priority under the first service and the second service, the first service corresponds to at least one second carrier, the at least one second carrier is a subset of the at least one first carrier, the second service corresponds to at least one third carrier, and the at least one third carrier is a subset of the at least one first carrier.

Optionally, the third carrier may be carriers a-h.

Optionally, according to a first correspondence, a terminal device may determine a carrier for transmitting data packets with at least one first data packet priority under the first service, and may determine a carrier for transmitting data packets with at least one first data packet priority under the second service.

Optionally, the quantity of carriers of the at least one second carrier is the same as that of the at least one first carrier, and the quantity of carriers of the at least one third carrier is the same as that of the at least one first carrier.

For example, the quantity of carriers of the at least one first carrier is 3, and the quantity of carriers of the at least one second carrier and the quantity of carriers of the at least one third carrier are also 3. The terminal device may determine a carrier that transmits data packets with at least one first data packet priority under first service or a carrier that transmits data packets with at least one first data packet priority under the second service according to a table indicating a correspondence between data packet priorities 1-8 and three carriers.

Optionally, the at least one second carrier has the same quantity of carriers as the at least one first carrier, the at least one third carrier has the same quantity of carriers as the at least one first carrier, and carriers in the at least one second carrier are the same as carriers in the at least one first carrier, and carriers in the at least one third carrier are the same as the carriers in the at least one first carrier.

For example, carriers of the at least one first carrier are carrier a, carrier b, and carrier c, and carriers of the at least one second carrier and that of the at least one third carrier are both carrier a, carrier b, and carrier c.

Optionally, the quantity of carriers of the at least one second carrier is the same as that of the at least one first carrier, the quantity of carriers of the at least one third carrier is the same as that of the at least one first carrier, and carriers of the at least one second carrier are partially or completely different from carriers of the at least one third carrier.

For example, the quantity of carriers of the at least one first carrier is 3, carriers of the at least one second carrier are carrier a, carrier b, and carrier c, and carriers of the at least one third carrier are carrier a, carrier e, and carrier f.

For another example, the quantity of carriers of the at least one first carrier is 3, carriers of the at least one second carrier are carrier a, carrier b, and carrier c, and carriers of the at least one third carrier are carrier d, carrier e, and carrier f.

Optionally, the quantity of carriers of the at least one second carrier is different from that of the at least one third carrier.

For example, carriers of the at least one second carrier are carrier a, carrier b, and carrier c, and carriers of the at least one third carrier are carrier e and carrier f.

For another example, carriers of the at least one second carrier are carrier a, carrier b, and carrier c, and carriers of the at least one third carrier are carrier b and carrier c.

Therefore, in the method for selecting a carrier of the implementation of the present disclosure, a terminal device determines a carrier for transmitting data packets with at least one first data packet priority according to configuration information indicating a first correspondence between the at least one first data packet priority and at least one first carrier, thereby reducing signaling overhead of the terminal device when determining carriers for transmitting data packets with different data packet priorities and improving efficiency of data transmission.

Figure 4:
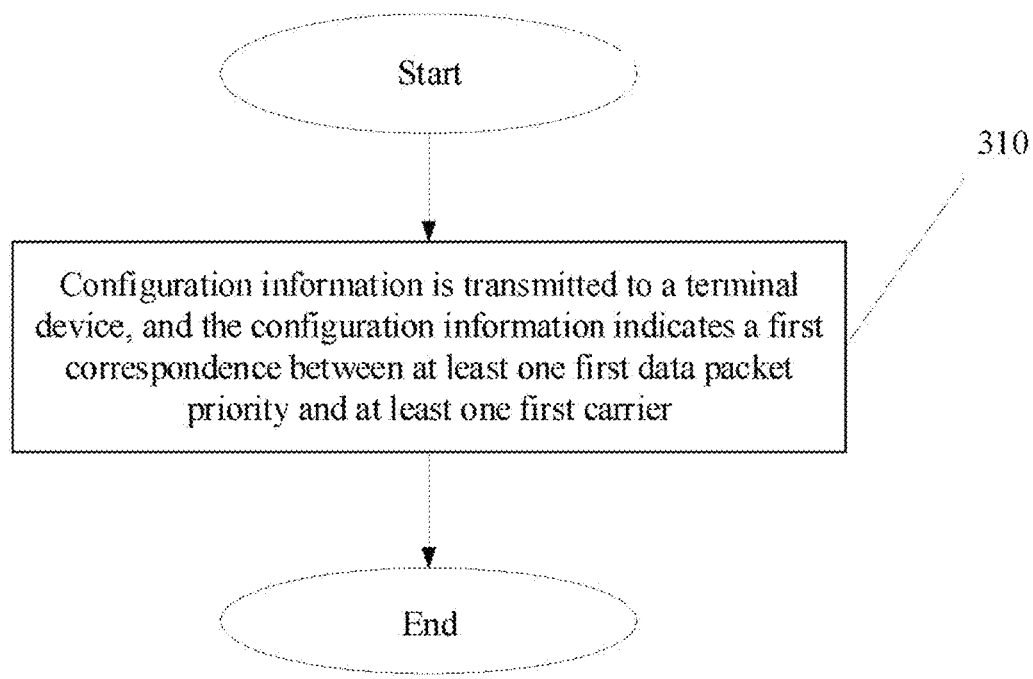
FIG. 4 is a schematic flow chart of another method for selecting a carrier according to an implementation of the present disclosure.

FIG. 4 is a schematic flow chart of a method 300 for selecting a carrier according to an implementation of the present disclosure. As shown in FIG. 4, the method 300 may be performed by a terminal device, or a core network device, or an access network device, and the method 300 is applied to Device-to-Device communication and includes the following contents.

In 310, configuration information is transmitted to a terminal device, and the configuration information indicates a first correspondence between at least one first data packet priority and at least one first carrier.

Optionally, a core network device transmits the configuration information to the terminal device.

Optionally, a higher layer of the terminal device transmits the configuration information to the terminal device.

Optionally, an access network device transmits the configuration information to the terminal device.

Specifically, the configuration information is transmitted to an access layer of the terminal device.

It should be understood that the description in the method 300 for selecting a carrier may refer to the related description in the method 200 for selecting a carrier, and will not be repeated here for the sake of brevity.

Therefore, in the method for selecting a carrier of the implementation of the present disclosure, a terminal device determines a carrier for transmitting data packets with at least one first data packet priority according to configuration information indicating a first correspondence between the at least one first data packet priority and at least one first carrier, thereby reducing signaling overhead of the terminal device when determining carriers for transmitting data packets with different data packet priorities and improving efficiency of data transmission.

Figure 5:
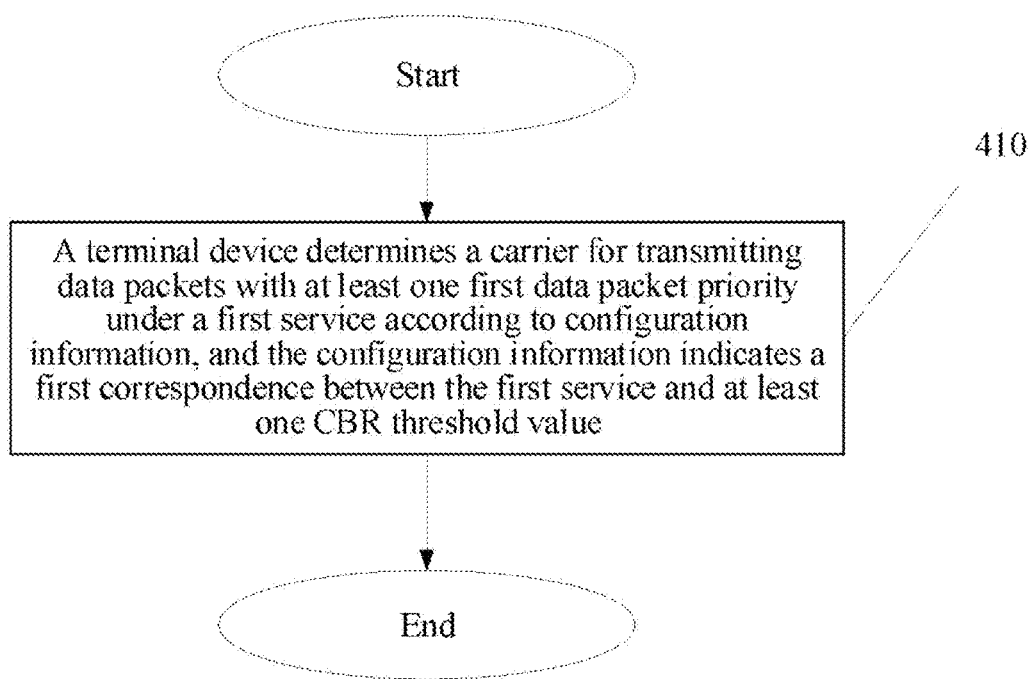
FIG. 5 is a schematic flow chart of yet another method for selecting a carrier according to an implementation of the present disclosure.

FIG. 5 is a schematic flow chart of a method 400 for selecting a carrier according to an implementation of the present disclosure. As shown in FIG. 5, the method 400 may be executed by a terminal device, which may be a terminal device as shown in FIG. 1 or FIG. 2, and is applied to Device-to-Device communication, and the method 400 includes the following contents.

In 410, a terminal device determines a carrier for transmitting data packets with at least one first data packet priority under a first service according to configuration information, and the configuration information indicates a first correspondence between the first service and at least one CBR threshold value.

Optionally, the terminal device may be a terminal device supporting D2D communication.

It should be understood that each service has a unique service identifier, data packets under each service may have different data packet priorities, and each service may send data packets with different data packet priorities.

Optionally, there are a total of 8 carriers for transmitting data packets, for example, a-h.

Optionally, each service may correspond to at least one carrier, for example, service 1 corresponds to carrier b and carrier c, and service 2 corresponds to carrier e, carrier f, carrier g and carrier h.

Optionally, a data packet priority may have 8 levels, for example, 1-8.

Optionally, the first data packet priority may be data packet priorities 1-8.

Optionally, an order of data packet priorities of data packets may be: data packet priority 1>data packet priority 2>data packet priority 3>data packet priority 4>data packet priority 5>data packet priority 6>data packet priority 7>data packet priority 8.

Optionally, the less a CBR threshold value is, the better transmission effect of a carrier is.

Optionally, a terminal device determines a current CBR value of all carriers, and determines a carrier for transmitting data packets with at least one first data packet priority under the first service according to the current CBR value and the at least one CBR threshold value.

For example, service 1 corresponds to CBR threshold values of 0.1-0.4, data packets with data packet priorities of 1 and 2 are transmitted on carriers with a current CBR value less than or equal to 0.1, data packets with data packet priorities of 3 and 4 are transmitted on carriers with a current CBR value less than or equal to 0.2, data packets with data packet priorities of 5 and 6 are transmitted on carriers with a current CBR value less than or equal to 0.3, and data packets with data packet priorities of 7 and 8 are transmitted on carriers with a current CBR value less than or equal to 0.4.

For another example, service 1 corresponds to CBR threshold values of 0.1-0.4, data packets with data packet priorities of 1-8 are transmitted on carriers with a current CBR value less than or equal to 0.1, data packets with data packet priorities of 3-8 are transmitted on carriers with a current CBR value less than or equal to 0.2, data packets with data packet priorities of 5-8 are transmitted on carriers with a current CBR value less than or equal to 0.3, and data packets with data packet priorities of 7 and 8 are transmitted on carriers with a current CBR value less than or equal to 0.4.

It should be understood that in the above two examples, manners in which a carrier for transmitting data packets with at least one first data packet priority under first service is determined are only illustrative, and the carrier for transmitting data packets with at least one first data packet priority under first service may be determined by other manners.

Optionally, the at least one CBR threshold value may be a CBR threshold value of the at least one first data packet priority or a CBR threshold value of the at least one first carrier.

Optionally, the first service corresponds to at least one first carrier.

Optionally, the first carrier may be carriers a-h.

Optionally, the terminal device selects a carrier for transmitting data packets with the at least one first data packet priority from the at least one first carrier.

For example, service 1 corresponds to CBR threshold values of 0.1-0.4, service 1 corresponds to carriers a-e, and the terminal device determines that a current CBR value of carriers a-e is: 0.1 for carrier a, 0.1 for carrier b, 0.3 for carrier c, 0.4 for carrier d, 0.2 for carrier e. The terminal device determines to transmit data packets with data packet priorities of 1 and 2 on carrier a and/or carrier b, to transmit data packets with data packet priorities of 3 and 4 on carrier e, to transmit data packets with data packet priorities of 5 and 6 on carrier c, and to transmit data packets with data packet priorities of 7 and 8 on carrier d.

Optionally, the at least one CBR threshold value may be a CBR threshold value of the at least one first data packet priority.

According to the configuration information, the terminal device determines the carrier for transmitting the data packet with the at least one first data packet priority, including that: the terminal device determines a current CBR value of the at least one first carrier; and the terminal device selects a carrier for transmitting data packets with the at least one first data packet priority from at least one first carrier whose current CBR value is less than or equal to a CBR threshold value of the at least one first data packet priority.

Optionally, the at least one CBR threshold value may be a CBR threshold value of the at least one first carrier.

According to the configuration information, the terminal device determines the carrier for transmitting the data packets with the at least one first data packet priority, including that: the terminal device determines a current CBR value of the at least one first carrier; and the terminal device selects a carrier for transmitting data packets with the at least one first data packet priority from carriers whose current CBR value is less than or equal to a CBR threshold value of the at least one first carrier.

Optionally, the terminal device receives the configuration information from a core network device. For example, an access layer of the terminal device receives the configuration information from a core network device.

Optionally, an access layer of the terminal device receives the configuration information from a higher layer of the terminal device.

Therefore, in the method for selecting a carrier of the implementation of the present disclosure, the terminal device determines a carrier for transmitting data packets with at least one first data packet priority according to configuration information indicating a first correspondence between first service and at least one CBR threshold value, thereby reducing signaling overhead of the terminal device when determining carriers for transmitting data packets with different data packet priorities and improving efficiency of data transmission.

Figure 6:
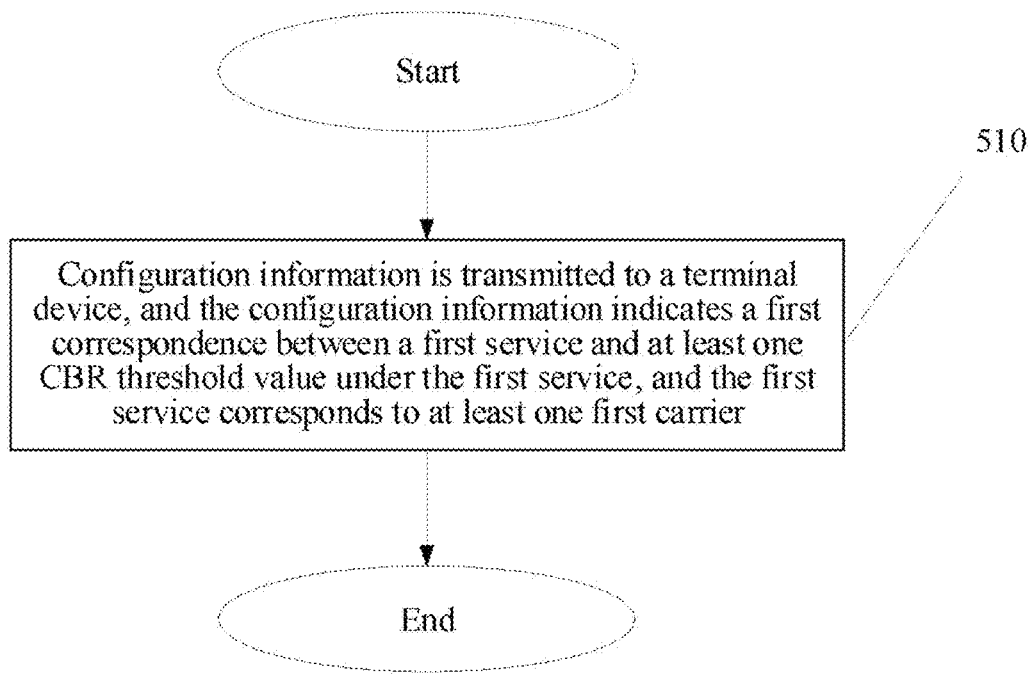
FIG. 6 is a schematic flow chart of yet another method for selecting a carrier according to an implementation of the present disclosure.

FIG. 6 is a schematic flow chart of a method 500 for selecting a carrier according to an implementation of the present disclosure. As shown in FIG. 6, the method 500 may be executed by a terminal device, or a core network device, or an access network device, and the method 500 is applied to Device-to-Device communication and includes the following contents.

In 510, configuration information is transmitted to a terminal device, wherein the configuration information indicates a first correspondence between a first service and at least one CBR threshold value under the first service, and the first service corresponds to at least one first carrier.

Optionally, the configuration information includes a CBR threshold value of the at least one first data packet priority.

Optionally, the configuration information includes a CBR threshold value of the at least one first carrier.

Optionally, a core network device transmits the configuration information to the terminal device.

Optionally, a higher layer of the terminal device transmits the configuration information to an access layer of the terminal device.

It should be understood that the description in the method 500 for selecting a carrier may refer to the related description in the method 400 for selecting a carrier, and will not be repeated here for the sake of brevity.

Therefore, in the method for selecting a carrier of the implementation of the present disclosure, the terminal device determines a carrier for transmitting data packets with at least one first data packet priority according to configuration information indicating a first correspondence between first service and at least one CBR threshold value, thereby reducing signaling overhead of the terminal device when determining carriers for transmitting data packets with different data packet priorities and improving efficiency of data transmission.

Figure 7:
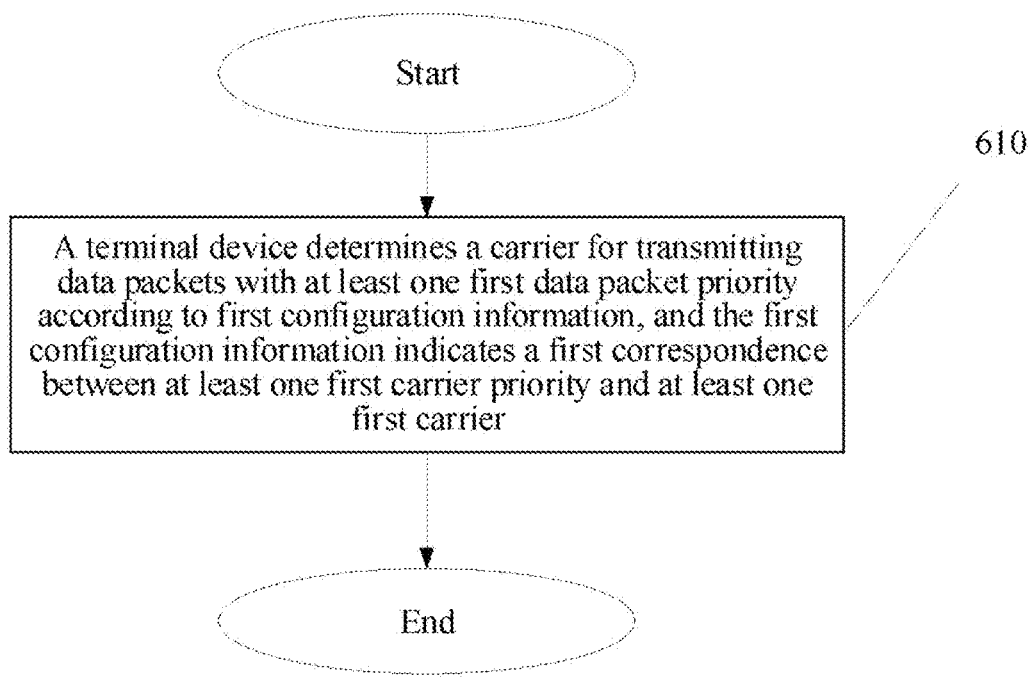
FIG. 7 is a schematic flow chart of yet another method for selecting a carrier according to an implementation of the present disclosure.

FIG. 7 is a schematic flow chart of a method 600 for selecting a carrier according to an implementation of the present disclosure. As shown in FIG. 7, the method 600 may be executed by a terminal device, which may be a terminal device as shown in FIG. 1 or FIG. 2, and is applied to Device-to-Device communication, and the method 600 includes the following contents.

In 610, a terminal device determines a carrier for transmitting data packets with at least one first data packet priority according to first configuration information, and the first configuration information indicates a first correspondence between at least one first carrier priority and at least one first carrier.

Optionally, the terminal device may be a terminal device supporting D2D communication.

It should be understood that each service has a unique service identifier, data packets under each service may have different data packet priorities, and each service may send data packets with different data packet priorities.

Optionally, there are a total of 8 carriers for transmitting data packets, for example, a-h.

Optionally, each service may correspond to at least one carrier, for example, service 1 corresponds to carrier b and carrier c, and service 2 corresponds to carrier e, carrier f, carrier g and carrier h.

Optionally, the first carrier may be carriers a-h.

Optionally, a data packet priority may have 8 levels, for example, 1-8.

Optionally, the first data packet priority may be data packet priorities 1-8.

Optionally, an order of data packet priorities of data packets may be: data packet priority 1>data packet priority 2>data packet priority 3>data packet priority 4>data packet priority 5>data packet priority 6>data packet priority 7>data packet priority 8.

Optionally, the first carrier priority may be carrier priorities 1-8.

Optionally, an order of carrier priorities of carriers may be: carrier priority 1>carrier priority 2>carrier priority 3>carrier priority 4>carrier priority 5>carrier priority 6>carrier priority 7>carrier priority 8.

Optionally, data packets with at least one first data packet priority are preferentially transmitted on a carrier with a higher priority.

Optionally, the carrier priority is used for instructing the terminal device to preferentially transmit the data packets with the at least one first data packet priority on a carrier with a higher carrier priority.

Optionally, the terminal device receives the first configuration information from a core network device.

Optionally, an access layer of the terminal device receives the first configuration information from a higher layer of the terminal device.

Optionally, the terminal device receives the first configuration information from an access network device.

Optionally, the first correspondence may be represented by one table, for example, Table 1, which includes a correspondence between carrier priorities 1-8 and carriers a-h.

For example, service 1 corresponds to carriers a-d, and then only a correspondence between carrier priorities 1-8 and carriers a-d in Table 1 is considered for service 1.

For another example, service 2 corresponds to carriers e-f, and then only a correspondence between carrier priorities 1-8 and carriers e-f in Table 1 is considered for service 2.

Optionally, the first correspondence may be represented by eight tables, for example, Tables 1-8, Table 1 includes a correspondence between carrier priorities 1-8 and one carrier, Table 2 includes a correspondence between carrier priorities 1-8 and two carriers, Table 3 includes a correspondence between carrier priorities 1-8 and three carriers, Table 4 includes a correspondence between carrier priorities 1-8 and four carriers, Table 5 includes a correspondence between carrier priorities 1-8 and five carriers, Table 6 includes a correspondence between carrier priorities 1-8 and six carriers, Table 7 includes a correspondence between carrier priorities 1-8 and seven carriers, and Table 8 includes a correspondence between carrier priorities 1-8 and eight carriers.

For example, service 1 corresponds to two carriers, and then only a correspondence between carrier priorities 1-8 and the two carriers in Table 2 is considered for service 1.

For another example, service 2 corresponds to five carriers, and then only the correspondence between carrier priorities 1-8 and the five carriers in Table 5 is considered for service 2.

Optionally, the first correspondence may be represented by n $(C_8^1+C_8^2+C_8^3+C_8^4+C_8^5+C_86+C_8^7+C_8^8)$ tables, for example, by Tables 1, 2, 3 . . . n. Table 1 includes a correspondence between carrier priorities 1-8 and carrier a, Table 2 includes a correspondence between carrier priorities 1-8 and carrier b, Table 3 includes a correspondence between carrier priorities 1-8 and carrier c, . . . , and Table n includes a correspondence between carrier priorities 1-8 and carriers a-h.

For example, service 1 corresponds to two carriers a and b, and then a table with the quantity of carriers of 2 and with carriers a and b, needs to be considered for service 1.

For another example, service 2 corresponds to two carriers e and f, and a table with the quantity of carriers of 2 and with carriers e and f, needs to be considered for service 2.

Optionally, the first correspondence may be specific to a specific service. For example, service 1 corresponds to two carriers a and b, and service 2 also corresponds to two carriers a and b. At this time, a first correspondence for service 1 is different from a first correspondence for service 2.

Optionally, the first correspondence may exist in a form of a list or an operation formula, and the implementation of the present disclosure does not limit thereto.

Optionally, the first correspondence is used for a first service, the first service corresponds to at least one second carrier, and the at least one second carrier is a subset of the at least one first carrier.

Optionally, the second carrier may be carriers a-h.

Optionally, according to the first configuration information, the terminal device determines the carrier for transmitting the data packets with the at least one first data packet priority, including that: the terminal device determines a second correspondence between the at least one first data packet priority and the at least one second carrier according to the first correspondence; and according to the second correspondence, the terminal device determines a carrier for transmitting the data packets with the at least one first data packet priority.

Optionally, the terminal device determines a second correspondence between the at least one first data packet priority and the at least one second carrier according to the first correspondence, including that: the terminal device determines the second correspondence according to second configuration information indicating a third correspondence from a correspondence between carrier priorities and carriers, and at least one carrier that corresponds to a target service, to a correspondence between data packet priorities and carriers.

For example, the first correspondence includes a correspondence between carrier priorities 1 and 2 and carriers a-h, wherein carrier priority 1 corresponds to carriers a-d and carrier priority 2 corresponds to carriers e-h. A terminal device may transmit data packets with data packet priorities 1-4 on carriers a-d corresponding to carrier priority 1 and transmit data packets with data packet priorities 5-8 on carriers e-h corresponding to carrier priority 2.

For another example, the first correspondence includes correspondence between carrier priorities 1-3 and carriers a-h, wherein carrier priority 1 corresponds to carriers a-c, carrier priority 2 corresponds to carriers d-f, and carrier priority 3 corresponds to carriers g-h. A terminal device may transmit data packets with data packet priorities 1-3 on carriers a-c corresponding to carrier priority 1, transmit data packets with data packet priorities 4-6 on carriers d-f corresponding to carrier priority 2, and transmit data packets with data packet priorities 7-8 on carriers g-h corresponding to carrier priority 3.

For another example, the first correspondence includes a correspondence between carrier priorities 1-4 and carriers a-h, wherein carrier priority 1 corresponds to carriers a-b, carrier priority 2 corresponds to carriers c-d, carrier priority 3 corresponds to carriers e-f, and carrier priority 4 corresponds to carriers g-h. A terminal device may transmit data packets with data packet priorities 1-8 on carriers a-b corresponding to carrier priority 1, transmit data packets with data packet priorities of 3-8 on carriers c-d corresponding to carrier priority 2, transmit data packets with data packet priorities of 5-8 on carriers e-f corresponding to carrier priority 3, and transmit data packets with data packet priorities of 7-8 on the carriers g-h corresponding to carrier priority 4.

Optionally, the terminal device receives the second configuration information from a core network device.

Optionally, an access layer of the terminal device receives the second configuration information from a higher layer of the terminal device.

Optionally, the terminal device receives the second configuration information from an access network device.

Optionally, the at least one second carrier is the same as the at least one first carrier.

For example, the at least one second carrier is carriers a-h, and the at least one first carrier is also carriers a-h.

Optionally, the first correspondence is used for a first service, the first service corresponds to at least one second carrier, the at least one second carrier is a subset of the at least one first carrier, the first correspondence is also used for a second service, the second service corresponds to at least one third carrier, and the at least one third carrier is a subset of the at least one first carrier.

Optionally, the third carrier may be carriers a-h.

Optionally, the terminal device determines the carrier for transmitting the data packets with the at least one first data packet priority according to the configuration information, including that: the terminal device determines a fourth correspondence between the at least one first data packet priority and the at least one third carrier according to the first correspondence; and according to the fourth correspondence, the terminal device determines the carrier for transmitting the data packets with the at least one first data packet priority.

Optionally, the terminal device determines a fourth correspondence between the at least one first data packet priority and the at least one third carrier according to the first correspondence, including that: the terminal device determines the fourth correspondence according to the second configuration information.

Optionally, the terminal device determines a fourth correspondence between the at least one first data packet priority and the at least one third carrier according to the first correspondence, including that: the terminal device receives third configuration information, and the third configuration information indicates a fifth correspondence from a correspondence between carrier priorities and carriers, and at least one carrier that corresponds to a target service, to a correspondence between data packet priorities and carriers; and the terminal device determines the fourth correspondence according to the fifth correspondence.

For example, the first correspondence includes a correspondence between carrier priorities 1 and 2 and carriers a-h, wherein carrier priority 1 corresponds to carriers a-d and carrier priority 2 corresponds to carriers e-h. A terminal device may transmit data packets with data packet priorities 1-4 on carriers a-d corresponding to carrier priority 1 and transmit data packets with data packet priorities 5-8 on carriers e-h corresponding to carrier priority 2.

For another example, the first correspondence includes correspondence between carrier priorities 1-3 and carriers a-h, wherein carrier priority 1 corresponds to carriers a-c, carrier priority 2 corresponds to carriers d-f, and carrier priority 3 corresponds to carriers g-h. A terminal device may transmit data packets with data packet priorities 1-3 on carriers a-c corresponding to carrier priority 1, transmit data packets with data packet priorities 4-6 on carriers d-f corresponding to carrier priority 2, and transmit data packets with data packet priorities 7-8 on carriers g-h corresponding to carrier priority 3.

For another example, the first correspondence includes a correspondence between carrier priorities 1-4 and carriers a-h, wherein carrier priority 1 corresponds to carriers a-b, carrier priority 2 corresponds to carriers c-d, carrier priority 3 corresponds to carriers e-f, and carrier priority 4 corresponds to carriers g-h. A terminal device may transmit data packets with data packet priorities 1-8 on carriers a-b corresponding to carrier priority 1, transmit data packets with data packet priorities of 3-8 on carriers c-d corresponding to carrier priority 2, transmit data packets with data packet priorities of 5-8 on carriers e-f corresponding to carrier priority 3, and transmit data packets with data packet priorities of 7-8 on the carriers g-h corresponding to carrier priority 4.

Optionally, the quantity of carriers of the at least one second carrier is the same as that of the at least one first carrier, and the quantity of carriers of the at least one third carrier is the same as that of the at least one first carrier.

For example, the quantity of carriers of the at least one first carrier is 3, and the quantity of carriers of the at least one second carrier and the quantity of carriers of the at least one third carrier are also 3. The terminal device may determine a carrier that transmits data packets with at least one first data packet priority under first service or a carrier that transmits data packets with at least one first data packet priority under the second service according to a table indicating a correspondence between data packet priorities 1-8 and three carriers.

Optionally, the at least one second carrier has the same quantity of carriers as the at least one first carrier, the at least one third carrier has the same quantity of carriers as the at least one first carrier, and carriers in the at least one second carrier are the same as carriers in the at least one first carrier, and carriers in the at least one third carrier are the same as the carriers in the at least one first carrier.

For example, carriers of the at least one first carrier are carrier a, carrier b, and carrier c, and carriers of the at least one second carrier and that of the at least one third carrier are both carrier a, carrier b, and carrier c.

Optionally, the quantity of carriers of the at least one second carrier is the same as that of the at least one first carrier, the quantity of carriers of the at least one third carrier is the same as that of the at least one first carrier, and carriers of the at least one second carrier are partially or completely different from carriers of the at least one third carrier.

For example, the quantity of carriers of the at least one first carrier is 3, carriers of the at least one second carrier are carrier a, carrier b, and carrier c, and carriers of the at least one third carrier are carrier a, carrier e, and carrier f.

For another example, the quantity of carriers of the at least one first carrier is 3, carriers of the at least one second carrier are carrier a, carrier b, and carrier c, and carriers of the at least one third carrier are carrier d, carrier e, and carrier f.

Optionally, the quantity of carriers of the at least one second carrier is different from that of the at least one third carrier.

For example, carriers of the at least one second carrier are carrier a, carrier b, and carrier c, and carriers of the at least one third carrier are carrier e and carrier f.

For another example, carriers of the at least one second carrier are carrier a, carrier b, and carrier c, and carriers of the at least one third carrier are carrier b and carrier c.

Optionally, the terminal device receives the third configuration information from a core network device.

Optionally, an access layer of the terminal device receives the third configuration information from a higher layer of the terminal device.

Therefore, in the method for selecting a carrier of the implementation of the present disclosure, a terminal device determines a carrier for transmitting data packets with at least one first data packet priority according to first configuration information indicating a first correspondence between the at least one first data packet priority and at least one first carrier, thereby reducing signaling overhead of the terminal device when determining carriers for transmitting data packets with different data packet priorities and improving efficiency of data transmission.

Figure 8:
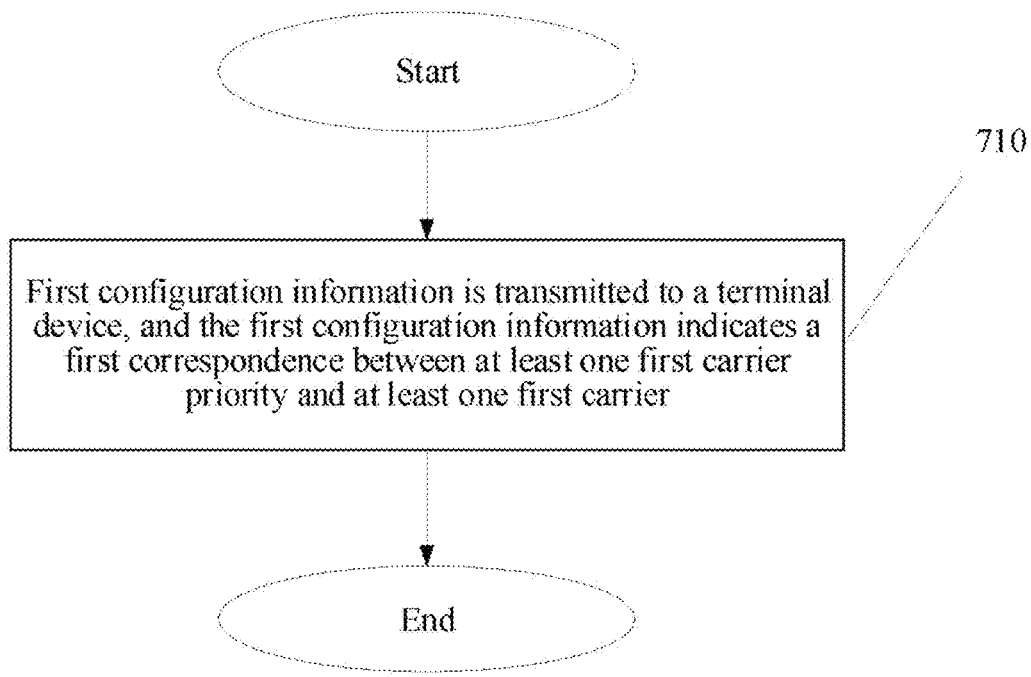
FIG. 8 is a schematic flow chart of yet another method for selecting a carrier according to an implementation of the present disclosure.

FIG. 8 is a schematic flow chart of a method 700 for selecting a carrier according to an implementation of the present disclosure. As shown in FIG. 8, the method 700 may be performed by a terminal device, or a core network device, or an access network device, and the method 700 is applied to Device-to-Device communication and includes the following contents.

In 710, first configuration information is transmitted to a terminal device, and the first configuration information indicates a first correspondence between at least one first carrier priority and at least one first carrier.

Optionally, the first correspondence is for a first service, the first service corresponds to at least one second carrier, and the at least one second carrier is a subset of the at least one first carrier.

Optionally, the method further includes that: second configuration information is transmitted to the terminal device, the second configuration information indicating a third correspondence from a correspondence between carrier priorities and carriers, and at least one carrier that corresponds to a target service, to a correspondence between data packet priorities and carriers.

Optionally, the first correspondence is also used for a second service that corresponds to at least one third carrier that is a subset of the at least one first carrier.

Optionally, the method further includes that: third configuration information is transmitted to the terminal device, and the third configuration information indicates a fifth correspondence from a correspondence between carrier priorities and carriers, and at least one carrier that corresponds to a target service, to a correspondence between data packet priorities and carriers.

Optionally, the carrier priority is also used for instructing the terminal device to preferentially transmit the data packets with the at least one first data packet priority on a carrier with a higher carrier priority.

Optionally, a core network device transmits the first configuration information to the terminal device.

Optionally, a higher layer of the terminal device transmits the first configuration information to an access layer of the terminal device.

Optionally, an access network device transmits the first configuration information to the terminal device.

Optionally, a core network device transmits the second configuration information to the terminal device.

Optionally, a higher layer of the terminal device transmits the second configuration information to an access layer of the terminal device.

Optionally, an access network device transmits the second configuration information to the terminal device.

Optionally, a core network device transmits the third configuration information to the terminal device.

Optionally, a higher layer of the terminal device transmits the third configuration information to an access layer of the terminal device.

It should be understood that the description in the method 700 for selecting a carrier may refer to the related description in the method 600 for selecting a carrier, and will not be repeated here for the sake of brevity.

Therefore, in the method for selecting a carrier of the implementation of the present disclosure, a terminal device determines a carrier for transmitting data packets with at least one first data packet priority according to first configuration information indicating a first correspondence between the at least one first data packet priority and at least one first carrier, thereby reducing signaling overhead of the terminal device when determining carriers for transmitting data packets with different data packet priorities and improving efficiency of data transmission.

Figure 9:
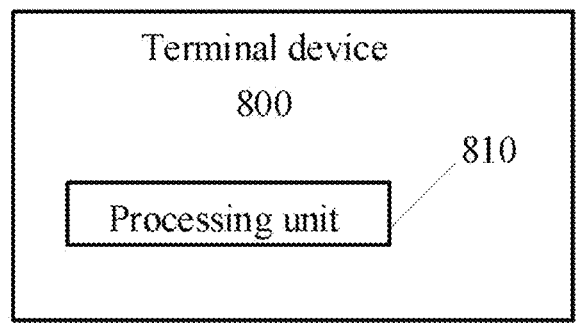
FIG. 9 is a schematic block diagram of a terminal device according to an implementation of the present disclosure.

FIG. 9 is a schematic block diagram of a terminal device 800 according to an implementation of the present disclosure. As shown in FIG. 9, the terminal device 800 is applied to Device-to-Device communication, including:

a processing unit 810, used for determining a carrier for transmitting data packets with at least one first data packet priority according to configuration information, wherein the configuration information indicates a first correspondence between the at least one first data packet priority and the at least one first carrier.

Optionally, the first correspondence is used for a first service, the at least one first data packet priority is a data packet priority under the first service, the first service corresponds to at least one second carrier, and the at least one second carrier is a subset of the at least one first carrier.

Optionally, the at least one second carrier is the same as the at least one first carrier.

Optionally, the first correspondence is also used for a second service, the at least one first data packet priority is a data packet priority under the second service, the second service corresponds to at least one third carrier, and the at least one third carrier is a subset of the at least one first carrier.

Optionally, the quantity of the at least one second carrier is the same as that of the at least one first carrier, and the quantity of the at least one third carrier is the same as that of the at least one first carrier.

Optionally, a carrier in the at least one second carrier is the same as a carrier in the at least one first carrier, and a carrier in the at least one third carrier is the same as the carrier in the at least one first carrier.

Optionally, carriers in the at least one second carrier are partially or completely different from carriers in the at least one third carrier.

Optionally, the quantity of carriers of the at least one second carrier is different from that of the at least one third carrier.

Optionally, before the processing unit 810 determines the carrier for transmitting the data packet with the at least one first data packet priority according to the configuration information, the terminal device 800 further includes: a receiving unit 820, used for receiving the configuration information from a core network device.

Optionally, before the processing unit 810 determines the carrier for transmitting the data packet with the at least one first data packet priority according to the configuration information, the receiving unit 820 is further used for receiving the configuration information from a higher layer of the terminal device.

Optionally, before the processing unit 810 determines the carrier for transmitting the data packet with the at least one first data packet priority according to the configuration information, the receiving unit 820 is further used for receiving the configuration information from an access network device.

It should be understood that the above-mentioned and other operations and/or functions of various modules in the terminal device 800 according to the implementation of the present disclosure are respectively to realize the corresponding processes of the terminal device in the method 200 in FIG. 3, and will not be repeated here for the sake of brevity.

Figure 10:
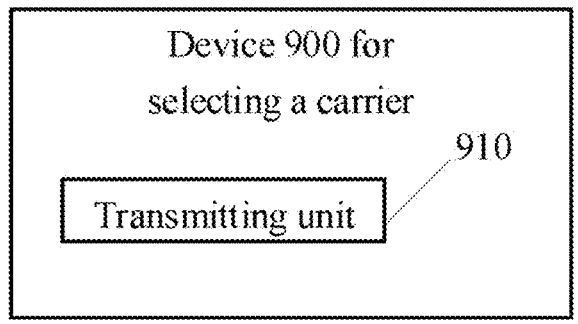
FIG. 10 is a schematic block diagram of a device for selecting a carrier according to an implementation of the present disclosure.

FIG. 10 is a schematic block diagram of a device 900 for selecting a carrier according to an implementation of the present disclosure. As shown in FIG. 10, the device 900 is applied to Device-to-Device communication, and includes: a transmitting unit 910, used for transmitting configuration information to a terminal device, wherein the configuration information indicates a first correspondence between at least one first data packet priority and at least one first carrier.

Optionally, the device 900 is a core network device.

Optionally, the device 900 is a higher layer of the terminal device.

Optionally, the device 900 is an access network device.

It should be understood that the above-mentioned and other operations and/or functions of various modules in the device 900 for selecting a carrier according to the implementation of the present disclosure are respectively to realize the corresponding processes of the device in the method 300 in FIG. 4, and will not be repeated here for the sake of brevity.

Figure 11:
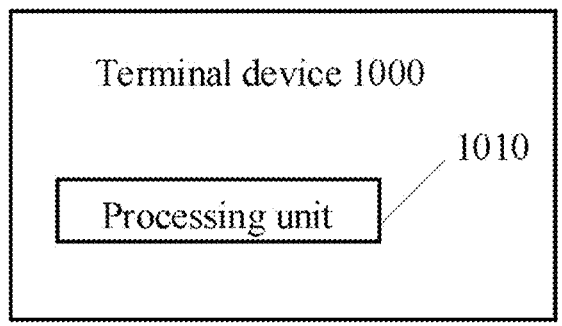
FIG. 11 is a schematic block diagram of a terminal device according to an implementation of the present disclosure.

FIG. 11 is a schematic block diagram of a terminal device 1000 according to an implementation of the present disclosure. As shown in FIG. 11, the terminal device 1000 is applied to Device-to-Device communication, and includes: a processing unit 1010, used for determining a carrier for transmitting data packets with at least one first data packet priority under a first service according to configuration information, and the configuration information indicates a first correspondence between the first service and at least one channel busy ratio (CBR) threshold value.

Optionally, the first service corresponds to at least one first carrier.

The processing unit 1010 is specifically used for: selecting a carrier for transmitting the data packets with the at least one first data packet priority from the at least one first carrier.

Optionally, the configuration information includes a channel busy ratio (CBR) threshold value of the at least one first data packet priority.

The processing unit 1010 is specifically used for: determining a current CBR value of the at least one first carrier; and selecting a carrier for transmitting the data packets with the at least one first data packet priority from at least one first carrier whose current CBR value is less than or equal to a CBR threshold value of the at least one first data packet priority.

Optionally, the configuration information includes a CBR threshold value of the at least one first carrier.

The processing unit 1010 is specifically used for: determining a current CBR value of the at least one first carrier; and selecting a carrier for transmitting the data packets with the at least one first data packet priority from carriers whose current CBR value is less than or equal to a CBR threshold value of the at least one first carrier.

Optionally, before the processing unit 1010 determines the carrier for transmitting the data packet with the at least one first data packet priority according to the configuration information, the terminal device 1000 further includes: a receiving unit 1020, used for receiving the configuration information from a core network device.

Optionally, before the processing unit 1010 determines the carrier for transmitting the data packet with the at least one first data packet priority according to the configuration information, the terminal device further includes: a receiving unit 1020, used for receiving the configuration information from a higher layer of the terminal device.

It should be understood that the above-mentioned and other operations and/or functions of various modules in the terminal device 1000 according to the implementation of the present disclosure are respectively to realize the corresponding processes of the terminal device in the method 400 in FIG. 5, and will not be repeated here for the sake of brevity.

Figure 12:
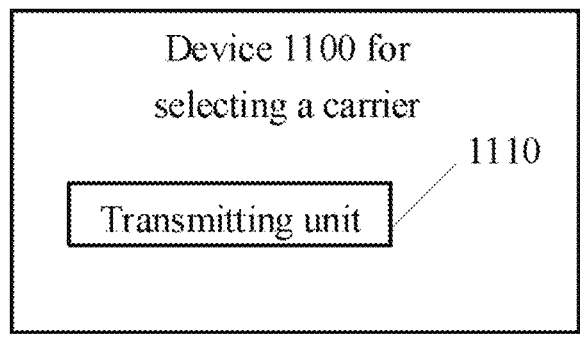
FIG. 12 is a schematic block diagram of a device for selecting a carrier according to an implementation of the present disclosure.

FIG. 12 is a schematic block diagram of a device 1100 for selecting a carrier according to an implementation of the present disclosure. As shown in FIG. 12, the device 1100 is applied to Device-to-Device communication, and includes: a transmitting unit 1110, used for transmitting configuration information to a terminal device, wherein the configuration information indicates a first correspondence between a first service and at least one channel busy ratio (CBR) threshold value under the first service, and the first service corresponds to at least one first carrier.

Optionally, the configuration information includes a channel busy ratio (CBR) threshold value of the at least one first data packet priority.

Optionally, the configuration information includes a CBR threshold value of the at least one first carrier.

Optionally, the device 1100 is a core network device.

Optionally, the device 1100 is a higher layer of the terminal device.

It should be understood that the above-mentioned and other operations and/or functions of various modules in the device 1100 for selecting a carrier according to the implementation of the present disclosure are respectively to realize the corresponding processes of the device in the method 500 in FIG. 6, and will not be repeated here for the sake of brevity.

Figure 13:
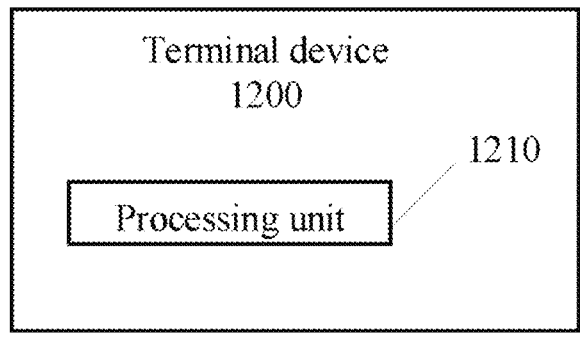
FIG. 13 is a schematic block diagram of a terminal device according to an implementation of the present disclosure.

FIG. 13 is a schematic block diagram of a terminal device 1200 according to an implementation of the present disclosure. As shown in FIG. 13, the terminal device 1200 is applied to Device-to-Device communication, and includes: a processing unit 1210, used for determining a carrier for transmitting data packets with at least one first data packet priority according to first configuration information, wherein the first configuration information indicates a first correspondence between at least one first carrier priority and at least one first carrier.

Optionally, the first correspondence is used for a first service, the first service corresponds to at least one second carrier, and the at least one second carrier is a subset of the at least one first carrier.

Optionally, the processing unit 1210 is specifically used for: determining a second correspondence between the at least one first data packet priority and the at least one second carrier according to the first correspondence; and determining the carrier for transmitting the data packets with the at least one first data packet priority according to the second correspondence.

Optionally, the processing unit 1210 is specifically used for: determining the second correspondence according to second configuration information indicating a third correspondence from a correspondence between carrier priorities and carriers, and at least one carrier that corresponds to a target service, to a correspondence between data packet priorities and carriers.

Optionally, the at least one second carrier is the same as the at least one first carrier.

Optionally, the first correspondence is also used for a second service that corresponds to at least one third carrier that is a subset of the at least one first carrier.

Optionally, the processing unit 1210 is specifically used for: determining a fourth correspondence between the at least one first data packet priority and the at least one third carrier according to the first correspondence; and determining the carrier for transmitting the data packets with the at least one first data packet priority according to the fourth correspondence.

Optionally, the processing unit 1210 is specifically used for: determining the fourth correspondence according to the second configuration information.

Optionally, the processing unit 1210 is specifically used for: receiving third configuration information indicating a fifth correspondence from a correspondence between carrier priorities and carriers, and at least one carrier that corresponds to a target service, to a correspondence between data packet priorities and carriers; and determining the fourth correspondence according to the fifth correspondence.

Optionally, the quantity of carriers of the at least one second carrier is the same as that of the at least one first carrier, and the quantity of carriers of the at least one third carrier is the same as that of the at least one first carrier.

Optionally, a carrier in the at least one second carrier is the same as a carrier in the at least one first carrier, and a carrier in the at least one third carrier is the same as the carrier in the at least one first carrier.

Optionally, carriers in the at least one second carrier are partially or completely different from carriers in the at least one third carrier.

Optionally, the quantity of carriers of the at least one second carrier is different from that of the at least one third carrier.

Optionally, the carrier priority is used for instructing the terminal device to preferentially transmit the data packet with the at least one first data packet priority on a carrier with a higher carrier priority.

Optionally, before the processing unit 1210 determines the carrier for transmitting the data packets with the at least one first data packet priority according to the first configuration information, the terminal device 1200 further includes: a receiving unit 1220, used for receiving the first configuration information from a core network device.

Optionally, before the processing unit determines the carrier for transmitting the data packets with the at least one first data packet priority according to the first configuration information, the terminal device 1200 further includes: a receiving unit 1220, used for receiving the first configuration information from a higher layer of the terminal device.

Optionally, before the processing unit 1210 determines the carrier for transmitting the data packets with the at least one first data packet priority according to the first configuration information, the terminal device 1200 further includes: a receiving unit 1220, used for receiving the first configuration information from an access network device.

Optionally, before the processing unit 1210 determines the third correspondence according to the second configuration information, the terminal device 1200 further includes: a receiving unit 1220, used for receiving the second configuration information from a core network device.

Optionally, before the processing unit 1210 determines the third correspondence according to the second configuration information, the terminal device 1200 further includes: a receiving unit 1220, used for receiving the second configuration information from a higher layer of the terminal device.

Optionally, before the processing unit 1210 determines the third correspondence according to the second configuration information, the terminal device 1200 further includes: a receiving unit 1220, used for receiving the second configuration information from an access network device.

Optionally, before the processing unit 1210 determines the fifth correspondence according to the third configuration information, the terminal device further includes: a receiving unit 1220, used for receiving the third configuration information from a core network device.

Optionally, before the processing unit 1210 determines the fifth correspondence according to the third configuration information, the terminal device 1200 further includes: a receiving unit 1220, used for receiving the third configuration information from a higher layer of the terminal device.

It should be understood that the above-mentioned and other operations and/or functions of various modules in the terminal device 1200 according to the implementation of the present disclosure are respectively in order to realize the corresponding processes of the terminal device in the method 600 in FIG. 7, and are not repeated here for the sake of brevity.

Figure 14:
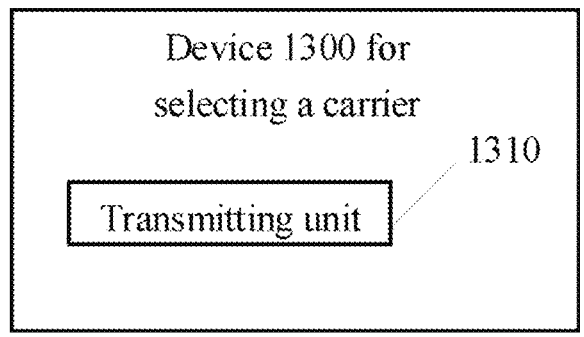
FIG. 14 is a schematic block diagram of a device for selecting a carrier according to an implementation of the present disclosure.

FIG. 14 is a schematic block diagram of a device 1300 for selecting a carrier according to an implementation of the present disclosure. As shown in FIG. 14, the device 1300 is applied to Device-to-Device communication, and includes: a transmitting unit 1310, used for transmitting first configuration information to a terminal device, wherein the first configuration information indicates a first correspondence between at least one first carrier priority and at least one first carrier.

Optionally, the first correspondence is for a first service, the first service corresponds to at least one second carrier, and the at least one second carrier is a subset of the at least one first carrier.

Optionally, the transmitting unit 1310 is further used for transmitting second configuration information to the terminal device, and the second configuration information indicates a third correspondence from a correspondence between carrier priorities and carriers, and at least one carrier that corresponds to a target service, to a correspondence between data packet priorities and carriers.

Optionally, the first correspondence is also used for a second service that corresponds to at least one third carrier that is a subset of the at least one first carrier.

Optionally, the transmitting unit 1310 is further used for: transmitting third configuration information to the terminal device, wherein the third configuration information indicates a fifth correspondence from a correspondence between carrier priorities and carriers, and at least one carrier that corresponds to a target service, to a correspondence between data packet priorities and carriers.

Optionally, the carrier priority is also used for instructing the terminal device to preferentially transmit the data packets with the at least one first data packet priority on a carrier with a higher carrier priority.

Optionally, the device 1300 is a core network device.

Optionally, the device 1300 is a higher layer of the terminal device.

Optionally, the device 1300 is an access network device.

It should be understood that the above-mentioned and other operations and/or functions of various modules in the device 1300 for selecting a carrier according to the implementation of the present disclosure are respectively to realize the corresponding processes of the device in the method 700 in FIG. 8, and will not be repeated here for the sake of brevity.

Figure 15:
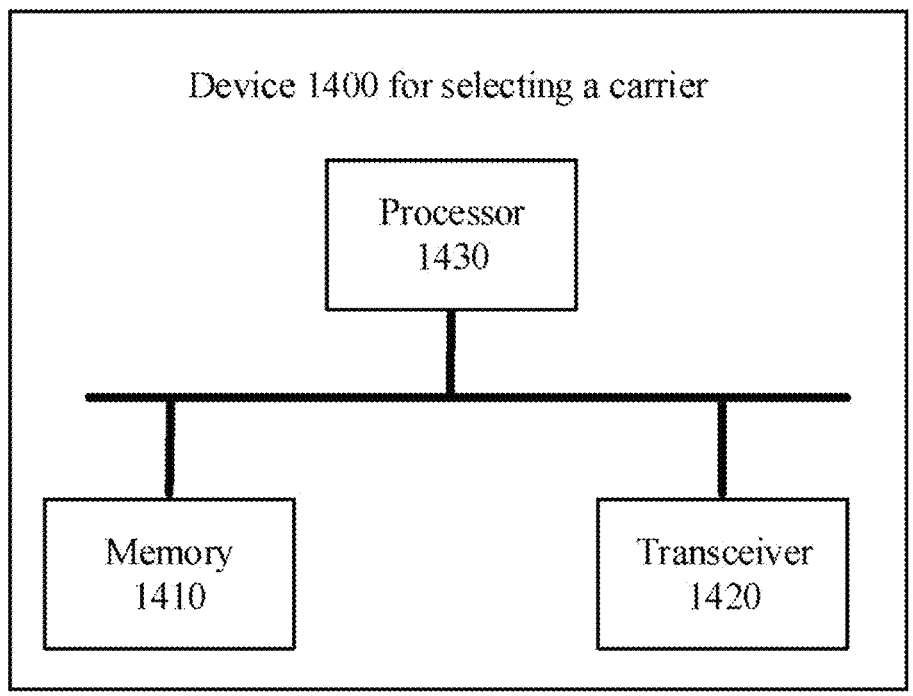
FIG. 15 shows a schematic block diagram of a device for selecting a carrier provided by an implementation of the present disclosure.

FIG. 15 shows a schematic block diagram of a device 1400 for selecting a carrier provided by an implementation of the present disclosure, the device 1400 includes: a memory 1410 for storing a program including codes; a transceiver 1420 for communicating with other devices; and a processor 1430 for executing program codes in the memory 1410.

Optionally, when the codes are executed, the processor 1430 may also implement various operations performed by the terminal device in the method 200 in FIG. 3, the method 400 in FIG. 5, or the method 600 in FIG. 7, which will not be repeated here for brevity. At this time, the device 1400 may be a terminal device, for example, a Vehicle User Equipment.

Optionally, when the codes are executed, the processor 1430 may also implement various operations performed by the device in the method 300 in FIG. 4, the method 500 in FIG. 6, or the method 700 in FIG. 8, which will not be repeated here for brevity. At this time, the device 1400 may be a terminal device, for example, a core network device, an access network device.

It should be understood that in the implementation of the present disclosure, the processor 1430 may be a Central Processing Unit (CPU), or the processor 1430 may be other general purpose processor, digital signal processors (DSP), application specific integrated circuits (ASIC), field programmable gate arrays (FPGA) or other programmable logic devices, discrete gate or transistor logic devices, discrete hardware components, etc. The general purpose processor may be a microprocessor or the processor may be any conventional processor or the like.

The memory 1410 may include the read only memory and random access memory, and provide instructions and data to the processor 1430. A portion of the memory 1410 may also include non-volatile random access memory. For example, the memory 1410 may also store type information of a device.

Transceiver 1420 may be used to implement signal transmission and reception functions, such as frequency modulation and demodulation functions or up-conversion and down-conversion functions.

In the implementation process, at least one act of the method may be completed by an integrated logic circuit of hardware in the processor 1430, or the integrated logic circuit may complete the at least one act under a drive of instructions in a form of software. Therefore, the device 1400 for selecting a carrier may be a chip or chip set. The acts of the method disclosed in connection with the implementation of the present disclosure may be directly embodied to be completed by an execution of a hardware processor or by a combination of hardware and software modules in a processor. The software modules may be located in a storage medium commonly used in the art, such as a random access memory, flash memory, read-only memory, programmable read-only memory or electrically erasable programmable memory, or register. The storage medium is located in the memory, and the processor 1430 reads the information in the memory and accomplishes the acts of the method with its hardware. In order to avoid repetition, it will not be described in detail here.

Figure 16:
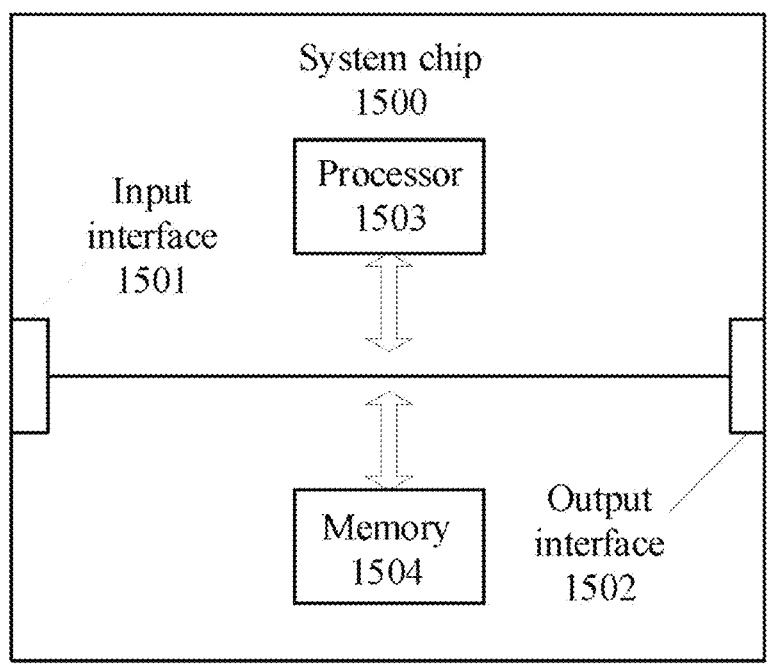
FIG. 16 is a schematic structural diagram of a system chip according to an implementation of the present disclosure.

FIG. 16 is a schematic structural diagram of a system chip 1500 according to an implementation of the present disclosure. The system chip 1500 of FIG. 16 includes an input interface 1501, an output interface 1502, a processor 1503 and a memory 1504, the processor 1503 and the memory 1504 may be connected through internal communication connection lines, and the processor 1503 is used for executing codes in the memory 1504.

Optionally, when the codes are executed, the processor 1503 implements the method executed by the terminal device in the method implementation. For the sake of brevity, it will not be repeated here.

Optionally, when the codes are executed, the processor 1503 implements the method executed by the device for selecting a carrier in the method implementation. For the sake of brevity, it will not be repeated here.

The implementations may be implemented in whole or in part by software, hardware, firmware, or any combination thereof. When implemented by software, the implementations may be implemented in whole or in part in a form of a computer program product. The computer program product includes one or more computer instructions. When the computer program instructions are loaded and executed on a computer, the processes or functions described in the implementations of the present disclosure are generated in whole or in part. The computer may be a general purpose computer, a special purpose computer, a computer network, or other programmable apparatus. The computer instructions may be stored in a computer-readable storage medium or transmitted from one computer-readable storage medium to another, for example, the computer instructions may be transmitted from one web site site, computer, server or data center to another website site, computer, server or data center by a wired (e.g., coaxial cable, optical fiber, digital subscriber line (DSL)) or wireless (e.g., infrared, wireless, microwave and the like) manner. The computer-readable storage medium may be any available medium that a computer may access or a data storage device such as a server, a data center, or the like that integrates one or more available medium. The available medium may be a magnetic medium (e.g., floppy disk, hard disk, magnetic tape), an optical medium (e.g., DVD), or a semiconductor medium (e.g., Solid State Disk (SSD)) or the like.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

Those skilled in the art may clearly understand that for convenience and conciseness of description, the specific working processes of the system, apparatus and unit described above may refer to the corresponding processes in the aforementioned method implementations and will not be described here.

What are described above are merely specific implementations of the present disclosure, but the protection scope of the present disclosure is not limited thereto. Any change or substation that may be easily conceived by a person skilled in the art within the technical scope disclosed by the present disclosure shall be included within the protection scope of the present disclosure. Therefore, the scope of protection of the present disclosure shall be subject to that of the claims.

What we claim is:

1. A method for selecting a carrier, applied to Device-to-Device communication, comprising:
    determining, by a terminal device, a carrier for transmitting data packets with at least one first data packet priority according to configuration information, wherein the configuration information indicates a first correspondence between the at least one first data packet priority and at least one first carrier,
    wherein the first correspondence is used for a first service, the at least one first data packet priority is a data packet priority under the first service, the first service corresponds to at least one second carrier, and the at least one second carrier is a subset of the at least one first carrier.

2. The method according to claim 1, wherein the at least one second carrier and the at least one first carrier are the same.

3. The method according to claim 1, wherein the first correspondence is also used for a second service, the at least one first data packet priority is a data packet priority under the second service, the second service corresponds to at least one third carrier, and the at least one third carrier is a subset of the at least one first carrier.

4. The method according to claim 3, wherein a quantity of carriers of the at least one second carrier is the same as that of the at least one first carrier, and a quantity of carriers of the at least one third carrier is the same as that of the at least one first carrier; or,
    wherein a quantity of carriers of the at least one second carrier is different from that of the at least one third carrier.

5. The method according to claim 4, wherein carriers in the at least one second carrier are the same as carriers in the at least one first carrier, and carriers in the at least one third carrier are the same as the carriers in the at least one first carrier; or,
    wherein carriers in the at least one second carrier are partially or completely different from carriers in the at least one third carrier.

6. The method according to claim 1, wherein before the determining, by the terminal device, the carrier for transmitting the data packets with the at least one first data packet priority according to the configuration information, the method further comprises:
    receiving, by the terminal device, the configuration information from a core network device; or
    receiving, by an access layer of the terminal device, the configuration information from a higher layer of the terminal device; or
    receiving, by the terminal device, the configuration information from an access network device.

7. A terminal device, applied to Device-to-Device communication, comprising:
    a processor, used for determining a carrier for transmitting data packets with at least one first data packet priority according to configuration information, wherein the configuration information indicates a first correspondence between the at least one first data packet priority and at least one first carrier, wherein the first correspondence is used for a first service, the at least one first data packet priority is a data packet priority under the first service, the first service corresponds to at least one second carrier, and the at least one second carrier is a subset of the at least one first carrier.

8. The terminal device according to claim 7, wherein the at least one second carrier and the at least one first carrier are the same.

9. The terminal device according to claim 7, wherein the first correspondence is also used for a second service, the at least one first data packet priority is a data packet priority under the second service, the second service corresponds to at least one third carrier, and the at least one third carrier is a subset of the at least one first carrier.

10. The terminal device according to claim 9, wherein a quantity of carriers of the at least one second carrier is the same as that of the at least one first carrier, and a quantity of carriers of the at least one third carrier is the same as that of the at least one first carrier.

11. The terminal device according to claim 10, wherein carriers in the at least one second carrier are the same as carriers in the at least one first carrier, and carriers in the at least one third carrier are the same as the carriers in the at least one first carrier; or, wherein carriers in the at least one second carrier are partially or completely different from carriers in the at least one third carrier.

12. The terminal device according to claim 9, wherein a quantity of carriers of the at least one second carrier is different from that of the at least one third carrier.

13. The terminal device according to claim 7, wherein before the processor determines the carrier for transmitting the data packets with the at least one first data packet priority according to the configuration information, the terminal device further comprises:

a transceiver, used for receiving the configuration information from a core network device; or a transceiver, used for receiving the configuration information from a higher layer of the terminal device; or a transceiver, used for receiving the configuration information from an access network device.

14. A terminal device, applied to Device-to-Device communication, comprising:

a processor, used for determining a carrier for transmitting data packets with at least one first data packet priority under a first service according to configuration information, wherein the configuration information indicates a first correspondence between the first service and at least one channel busy ratio (CBR) threshold value, wherein the first service corresponds to at least one first carrier; and the processor is specifically used for:
selecting the carrier for transmitting the data packets with the at least one first data packet priority from the at least one first carrier, wherein the configuration information comprises a CBR threshold value of the at least one first data packet priority; and the processor is specifically used for:
determining a current CBR value of the at least one first carrier; and
selecting the carrier for transmitting the data packets with the at least one first data packet priority from at least one first carrier whose current CBR value is less than or equal to the CBR threshold value of the at least one first data packet priority, or, the configuration information comprises a CBR threshold value of the at least one first carrier; and the processor is specifically used for:
determining a current CBR value of the at least one first carrier; and
selecting the carrier for transmitting the data packets with the at least one first data packet priority from carriers whose current CBR value is less than or equal to the CBR threshold value of the at least one first carrier.

15. The terminal device according to claim 14, wherein before the processor determines the carrier for transmitting the data packets with the at least one first data packet priority according to the configuration information, the terminal device further comprises:

a transceiver, used for receiving the configuration information from a core network device; or a transceiver, used for receiving the configuration information from a higher layer of the terminal device.

* * * * *